United States Patent
Jarrold et al.

(10) Patent No.: US 12,255,060 B2
(45) Date of Patent: Mar. 18, 2025

(54) INSTRUMENT FOR SEPARATING IONS INCLUDING AN ELECTROSTATIC LINEAR ION TRAP TO SIMULTANEOUSLY TRAP MULTIPLE IONS

(71) Applicant: THE TRUSTEES OF INDIANA UNIVERSITY, Bloomington, IN (US)

(72) Inventors: Martin F. Jarrold, Bloomington, IN (US); Daniel Botamanenko, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 284 days.

(21) Appl. No.: 18/146,768

(22) Filed: Dec. 27, 2022

(65) Prior Publication Data

US 2023/0154741 A1 May 18, 2023

Related U.S. Application Data

(63) Continuation of application No. 17/293,852, filed as application No. PCT/US2019/013285 on Jan. 11, 2019, now Pat. No. 11,562,896.

(Continued)

(51) Int. Cl.
*H01J 49/42* (2006.01)
*G01N 27/623* (2021.01)
(Continued)

(52) U.S. Cl.
CPC ........ *H01J 49/4245* (2013.01); *G01N 27/623* (2021.01); *H01J 49/022* (2013.01);
(Continued)

(58) Field of Classification Search
CPC .... H01J 49/4245; H01J 49/022; H01J 49/025; H01J 49/426; H01J 49/482; H01J 49/027; G01N 27/623
(Continued)

(56) References Cited

U.S. PATENT DOCUMENTS

| 3,019,168 A | 1/1962 | Taylor |
| 5,285,063 A | 2/1994 | Schwartz et al. |

(Continued)

FOREIGN PATENT DOCUMENTS

| GB | 201000649 | 3/2010 |
| JP | 11144675 | 5/1999 |

(Continued)

OTHER PUBLICATIONS

Office Action and Search Report for co-pending Chinese Patent Application No. 201980079672.7, dated Nov. 1, 2023. (English translation appended).

(Continued)

*Primary Examiner* — Kiet T Nguyen
(74) *Attorney, Agent, or Firm* — Barnes & Thornburg LLP

(57) ABSTRACT

A charge detection mass spectrometer may include an ion source to generate ions, a mass spectrometer to separate the generated ions as a function of ion mass-to-charge ratio to produce beam of separated ions, an electrostatic linear ion trap (ELIT) including a charge detection cylinder disposed between a pair of coaxially aligned ion mirrors, and means for controlling a trajectory of the beam of separated ions entering the ELIT to cause the ions subsequently trapped in the ELIT to oscillate therein with different planar ion oscillation trajectories angularly offset from one another about the longitudinal axis with each extending along and crossing the longitudinal axis in each of the ion mirrors or with different cylindrical ion oscillation trajectories radially offset from one another about the longitudinal axis to form nested cylindrical trajectories each extending along the longitudinal axis.

20 Claims, 8 Drawing Sheets

Related U.S. Application Data

(60) Provisional application No. 62/774,703, filed on Dec. 3, 2018.

(51) Int. Cl.
*H01J 49/02* (2006.01)
*H01J 49/48* (2006.01)

(52) U.S. Cl.
CPC .......... *H01J 49/025* (2013.01); *H01J 49/426* (2013.01); *H01J 49/482* (2013.01)

(58) Field of Classification Search
USPC ........................................................ 250/282
See application file for complete search history.

(56) References Cited

U.S. PATENT DOCUMENTS

| | | | |
|---|---|---|---|
| 5,478,745 A | 12/1995 | Samulski | |
| 5,572,025 A | 11/1996 | Cotter | |
| 5,770,857 A | 6/1998 | Fuerstenau et al. | |
| 5,863,541 A | 1/1999 | Samulski et al. | |
| 5,869,248 A | 2/1999 | Yuan et al. | |
| 5,877,022 A | 3/1999 | Stinchcomb et al. | |
| 5,880,466 A | 3/1999 | Benner | |
| 5,882,652 A | 3/1999 | Valdes et al. | |
| 5,886,346 A | 3/1999 | Makarov | |
| 5,905,040 A | 5/1999 | Mazzara et al. | |
| 5,916,563 A | 6/1999 | Young et al. | |
| 5,965,358 A | 10/1999 | Carrion et al. | |
| 6,013,487 A | 1/2000 | Mitchell | |
| 6,083,702 A | 7/2000 | Mitchell et al. | |
| 6,156,303 A | 12/2000 | Russell et al. | |
| 6,183,950 B1 | 2/2001 | Madonna | |
| 6,583,408 B2 | 6/2003 | Smith et al. | |
| 6,744,042 B2 | 6/2004 | Zajfman et al. | |
| 6,753,523 B1 | 6/2004 | Whitehouse | |
| 6,888,130 B1 | 5/2005 | Gonin | |
| 7,314,912 B1 | 1/2008 | Hallek et al. | |
| 7,829,842 B2 | 11/2010 | Makarov | |
| 8,294,085 B2 | 10/2012 | Ding | |
| 8,395,112 B1 | 3/2013 | Bier | |
| 8,409,870 B2 | 4/2013 | Van Wuijckhuijse | |
| 8,766,170 B2 | 7/2014 | Guna et al. | |
| 8,866,074 B2 | 10/2014 | Okumura | |
| 8,963,075 B2 | 2/2015 | Chen et al. | |
| 9,095,793 B2 | 8/2015 | Flagan | |
| 10,056,244 B1 | 8/2018 | Quarmby et al. | |
| 10,088,451 B2 | 10/2018 | Giles et al. | |
| 11,232,941 B2 * | 1/2022 | Jarrold ................ | H01J 49/4235 |
| 11,257,665 B2 | 2/2022 | Jarrold et al. | |
| 11,594,405 B2 * | 2/2023 | Jarrold ................ | H01J 49/0009 |
| 11,646,191 B2 * | 5/2023 | Jarrold .................... | H01J 49/48 |
| | | | 250/282 |
| 2002/0185606 A1 | 12/2002 | Smith et al. | |
| 2003/0155502 A1 | 8/2003 | Grosshans et al. | |
| 2004/0169137 A1 | 9/2004 | Westphall et al. | |
| 2005/0236375 A1 | 10/2005 | Gefter et al. | |
| 2007/0102634 A1 | 5/2007 | Frey et al. | |
| 2007/0254352 A1 | 11/2007 | Schaffer et al. | |
| 2009/0020694 A1 | 1/2009 | Florey | |
| 2009/0078866 A1 | 3/2009 | Li et al. | |
| 2009/0108194 A1 | 4/2009 | Page et al. | |
| 2009/0189069 A1 | 7/2009 | Chen | |
| 2009/0294641 A1 | 12/2009 | Konicek et al. | |
| 2009/0294655 A1 | 12/2009 | Ding et al. | |
| 2010/0084549 A1 | 4/2010 | Ermakov et al. | |
| 2010/0084552 A1 | 4/2010 | Kawana | |
| 2010/0090102 A1 | 4/2010 | Rather et al. | |
| 2010/0227310 A1 | 9/2010 | Manalis et al. | |
| 2010/0234837 A1 | 9/2010 | Alfano | |
| 2010/0314538 A1 | 12/2010 | Makarov et al. | |
| 2010/0320377 A1 | 12/2010 | Cotter | |
| 2011/0095175 A1 | 4/2011 | Bateman | |
| 2011/0240845 A1 | 10/2011 | Ding | |
| 2012/0112056 A1 | 5/2012 | Brucker et al. | |
| 2012/0282641 A1 | 11/2012 | Reilly et al. | |
| 2013/0068942 A1 | 3/2013 | Verenchikov | |
| 2013/0124099 A1 | 5/2013 | Ecker et al. | |
| 2013/0175440 A1 | 7/2013 | Perelman et al. | |
| 2013/0200261 A1 | 8/2013 | Mizutani et al. | |
| 2013/0234017 A1 | 9/2013 | Kaltashov et al. | |
| 2013/0327934 A1 | 12/2013 | Makarov et al. | |
| 2014/0197333 A1 | 7/2014 | Jolliffe et al. | |
| 2014/0299766 A1 | 10/2014 | Anderson et al. | |
| 2014/0346344 A1 | 11/2014 | Chen | |
| 2015/0008316 A1 | 1/2015 | Guna | |
| 2015/0021472 A1 | 1/2015 | Makarov | |
| 2015/0325425 A1 | 11/2015 | Makarov | |
| 2015/0331000 A1 | 11/2015 | Collier et al. | |
| 2016/0005580 A1 | 1/2016 | Grinfeld | |
| 2016/0035556 A1 | 2/2016 | Berkout et al. | |
| 2016/0181084 A1 | 6/2016 | Smith | |
| 2016/0336165 A1 | 11/2016 | Guna | |
| 2017/0040152 A1 | 2/2017 | Makarov | |
| 2017/0307565 A1 | 10/2017 | Clemmer et al. | |
| 2017/0372883 A1 | 12/2017 | Verenchikov | |
| 2018/0247805 A1 | 8/2018 | Continetti et al. | |
| 2019/0088459 A1 | 3/2019 | Takahashi | |
| 2019/0236142 A1 | 8/2019 | Balakrishnan | |
| 2020/0003739 A1 | 1/2020 | Yamamoto et al. | |
| 2020/0243317 A1 | 7/2020 | Lopez-Hilfiker et al. | |
| 2020/0357626 A1 | 11/2020 | Jarrold et al. | |
| 2021/0217606 A1 | 7/2021 | Jarrold et al. | |

FOREIGN PATENT DOCUMENTS

| | | |
|---|---|---|
| JP | 2002-520799 | 7/2002 |
| JP | 2007-506106 | 3/2007 |
| JP | 2008186730 A | 8/2008 |
| JP | 2011-507194 A | 3/2011 |
| JP | 2011523172 A | 8/2011 |
| JP | 2014501429 A | 1/2014 |
| JP | 2014-122908 A | 9/2014 |
| JP | 2014165053 A | 9/2014 |
| JP | 2016522401 A | 7/2016 |
| JP | 2019-056598 A | 4/2019 |
| WO | 1998011244 A1 | 3/1998 |
| WO | 1999061601 A1 | 12/1999 |
| WO | 2000/004568 A1 | 1/2000 |
| WO | 2000028004 A1 | 5/2000 |
| WO | 2000028061 A1 | 5/2000 |
| WO | 2001092551 A2 | 5/2001 |
| WO | 2003042704 A1 | 5/2003 |
| WO | 2005/081684 A2 | 9/2005 |
| WO | 2006130474 A2 | 12/2006 |
| WO | 2010135830 A1 | 12/2010 |
| WO | 2012080352 A1 | 6/2012 |
| WO | 2012083031 A1 | 6/2012 |
| WO | 2012145037 A1 | 10/2012 |
| WO | 2015104573 A1 | 7/2015 |
| WO | 2016073850 A1 | 5/2016 |
| WO | 2017162779 A1 | 9/2017 |
| WO | 2017190031 A1 | 11/2017 |
| WO | 2018109895 A1 | 6/2018 |
| WO | 2019118242 A1 | 6/2019 |
| WO | 2019140233 A1 | 7/2019 |
| WO | 2019162687 A1 | 8/2019 |
| WO | 2019/236142 A1 | 12/2019 |
| WO | 2019231854 A1 | 12/2019 |
| WO | 2020/117292 A1 | 6/2020 |
| WO | 2020/219527 A1 | 10/2020 |
| WO | 2021/158676 A1 | 8/2021 |

OTHER PUBLICATIONS

Qun Li et al., "Development of JMS-S3000-MALDI-TOF/TOF MS Utilizing a Spiral Ion Trajectory," Modern Scientific Instruments, (2011), Issue 5, pp. 178-181.

PCT International Search Report and Written Opinion completed by the ISA/US on Jan. 12, 2016 and issued in connection with PCT/US2015/059463.

(56) References Cited

OTHER PUBLICATIONS

PCT International Search Report and Written Opinion completed by the ISA/US on Jun. 19, 2017 and issued in connection with PCT/US2017/030163.
PCT International Search Report and Written Opinion completed by the ISA/EP on Feb. 14, 2019 and issued in connection with PCT/US2018/051944.
PCT International Search Report and Written Opinion completed by the ISA/EP on Apr. 18, 2019 and issued in connection with PCT/US2019/013251.
PCT International Search Report and Written Opinion completed by the ISA/EP on Apr. 16, 2019 and issued in connection with PCT/US2019/013274.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.
PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT/US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/US on Nov. 23, 2021 and issued in connection with PCT/US2020/052009.
PCT International Search Report and Written Opinion completed by the ISA/EP on Jul. 14, 2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions (m/e<59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi: 10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. 477-488 (1994).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Japanese Office Action dispatched Feb. 17, 2023 for application 2020-568389—11 pages.
European Office Action issued Mar. 3, 2023 for application 19732193.8—14 pages.
Chiorini, John A., et al. "Cloning of Adeno-Associated Virus Type 4 (MV4) and Generation of Recombinant MV4 Particles",Journal of Virology, vol. 71, pp. 6823-6833 (Sep. 1997).
Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al, A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.

(56) References Cited

OTHER PUBLICATIONS

Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap",.; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in An Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639, 2005.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5, Mar. 2014.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).

Kosaka, Nobuyoshi, et al., "Versatile roles of extracellular vesicles in cancer," J Clin Invest. 2016;126(4):1163-1172. https://doi.org/10.1172/JCI81130, 2016.
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1, No. 18,pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992)_.
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Sonalikar, Hrishikesh S., et al. "Numerical analysis of segmented-electrode Orbitraps", International Journal of Mass Spectrometry, Elsevier Science Publishers, Amsterdam, NL,vol. 395, Dec. 17, 2015 (Dec. 17, 2015), p. 36-48.
Shinholt, Deven L., et al., "A Frequency and Amplitude Scanned Quadrupole Mass Filter for the Analysis of High m/z Ions", Review of Scientific Instruments 85, 113109 (2014) (accepted Oct. 17, 2014; published online Nov. 21, 2014).

(56) References Cited

OTHER PUBLICATIONS

Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Syed, et al., Quadrupole mass filler: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Walters, Robert W., "Structure of Adeno-Associated Virus Serotype 5", Journal of Virology, vol. 78, No. 7, pp. B361-3371 (Apr. 2004).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al, "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and riangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
European Office Action dated Sep. 9, 2022 for application 19 702 775.8—5 pages.
European Office Action dated Sep. 9, 2022 for application 19 702 771.7—5 pages.
Examination report No. 1 issued Oct. 21, 2022 in Australian Application No. 2019281255—4 pages.
PCT International Search Report and Written Opinion completed by the ISA/US on Aug. 26, 2022 issued in connection with PCT/US2022/073503.
European Office Action dated Nov. 23, 2022 for application 19 702 773.3—5 pages.
Japanese Office Action dispatched Jan. 31, 2023 for co-pending application 2020-568364—9 pages.
Korean Office Action dated May 1, 2024 for co-pending application No. 10-2021-7019302.
Non-Final Office Action, mailed Sep. 29, 2024 and issued in connection with U.S. Appl. No. 17/781,483, 84 pages.
Japanese Office Action dispatched Jan. 18, 2023 for 2020-568469—16 pages (prior art document JP 2010-515210 English equivalent US 2013/327934A1,cited in this document have been previously submitted).
Japanese Office Action dispatched Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).
PCT International Search Report and Written Opinion completed by the ISA/US on Oct. 11, 2021 and issued in connection with PCT/US2021/034480.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.
Kiss et al. "Size, weight and position: ion mobility spectrometry and imaging MS combined", Anal Bioanal Chem. 2011. 399: pp. 2623-2634, especially: p. 2626, col. 1, para 1 . . . .
Extended EP Search Report completed 29AUG24 and issued in connection with EP Appln. No. 24174366., 12 pages.
English translation of an Office Action for Japanese Patent Appln. No. 2022-547047, dated Aug. 1, 2024.
Japanese Office Action dispatched Jan. 6, 2023 for application 2020-568366—9 pages (Doussineau article cited in this document have been previously submitted).
Office Action and Search Report for CN patent application No. 201980051696.1, dated Sep. 25, 2023. (translation appended).
Japanese Office Action dispatched Jan. 24, 2023 for co-pending application 2021-527871—4 pages (Prior art reference Alexander Makarov has been previously submitted).
English translation of an Office Action for Japanese Patent Appln. No. 2022-537367, dated Oct. 8, 2024, 6 pages.
English translation of an Office Action for Japanese Patent Appln. No. 2022-537360, dated Oct. 8, 2024, 3 pages.
European Office Action dated Dec. 9, 2024 and issued in connection with EP Appln. No. 20839501.2, 5 pages.
European Office Action dated Dec. 9, 2024 and issued in connection with EP Appln. No. 20839500.4, 5 pages.
Extended EP Search Report, mailed Nov. 28, 2024 and issued in connection with EP Appln. No. 24195623.4, 10 pages.
English translation of a Final Office Action for Japanese Patent Appln. No. 2022-521245, dated Oct. 1, 2024, 9 pages.
Japanese Office Action (including English translation) issued in App. No. JP2022537360, dated Oct. 8, 2024, 6 pages.

(56) References Cited

OTHER PUBLICATIONS

Japanese Office Action (including English translation) issued in App. No. JP2022537367, dated Oct. 8, 2024, 11 pages.
Japanese Office Action (including English translation) issued in App. No. JP2022518995, dated Dec. 3, 2024, 6 pages.
Chinese Office Action (including English translation) issued in App. No. CN202080096842.5, dated Dec. 12, 2024, 19 pages.

* cited by examiner

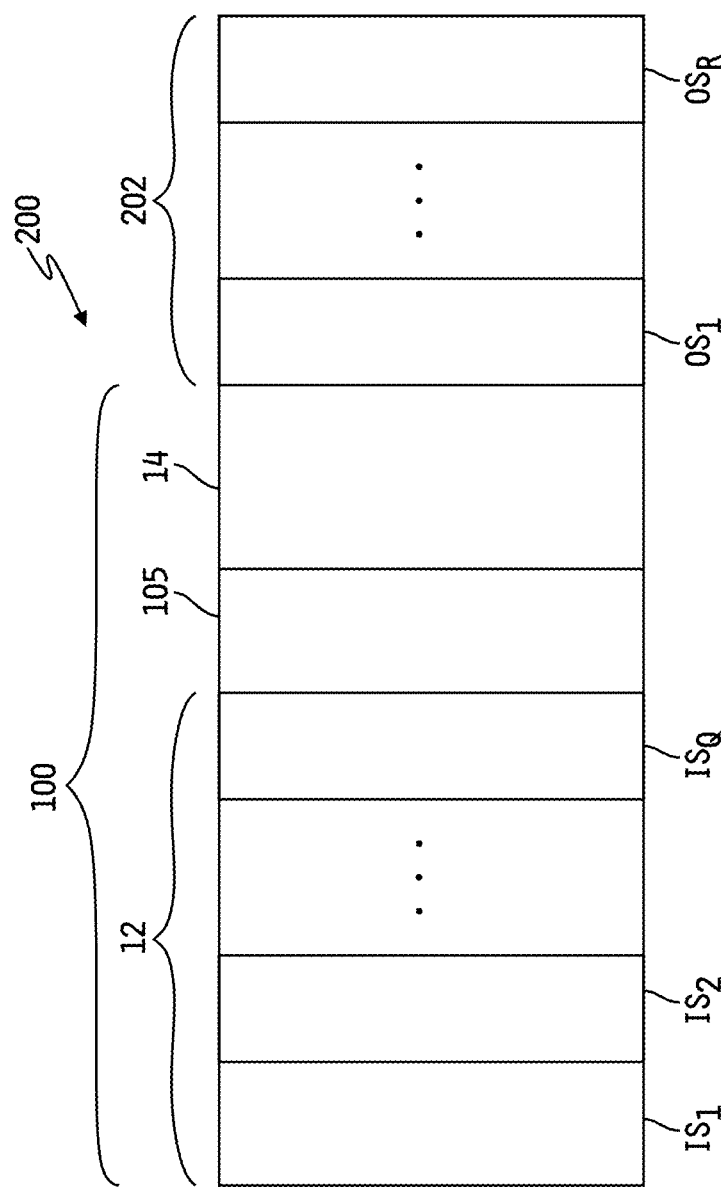
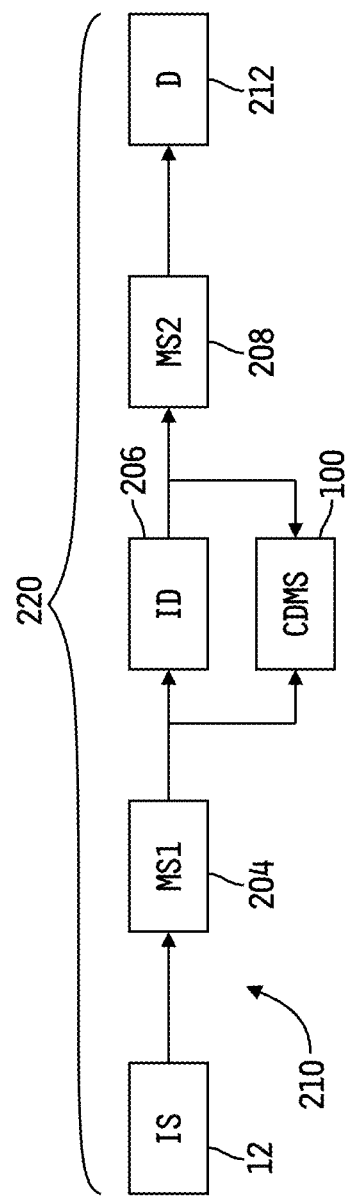

INSTRUMENT FOR SEPARATING IONS INCLUDING AN ELECTROSTATIC LINEAR ION TRAP TO SIMULTANEOUSLY TRAP MULTIPLE IONS

CROSS-REFERENCE TO RELATED APPLICATION

This application is a continuation of U.S. patent application Ser. No. 17/293,852, filed May 13, 2021, which is a U.S. national stage entry of PCT Application No. PCT/US2019/013285, filed Jan. 11, 2019, which claims the benefit of and priority to U.S. Provisional Patent Application Ser. No. 62/774,703, filed Dec. 3, 2018, the disclosures of which are incorporated herein by reference in their entireties.

GOVERNMENT RIGHTS

This invention was made with government support under CHE1531823 awarded by the National Science Foundation. The United States Government has certain rights in the invention.

TECHNICAL FIELD

The present disclosure relates generally to charge detection mass spectrometry instruments, and more specifically to instruments for simultaneously analyzing multiple ions with an electrostatic linear ion trap.

BACKGROUND

Mass Spectrometry provides for the identification of chemical components of a substance by separating gaseous ions of the substance according to ion mass and charge. Various instruments have been developed for determining the masses of such separated ions, and one such instrument is a charge detection mass spectrometer (CDMS). CDMS is conventionally a single-particle instrument and technique in which ion mass is determined for each ion individually as a function of measured ion mass-to-charge ratio, typically referred to as "m/z," and measured ion charge. Some such CDMS instruments employ an electrostatic linear ion trap (ELIT) detector in which ions are made to oscillate back and forth through a charge detection cylinder. Multiple passes of ions through such a charge detection cylinder provides for multiple measurements for each ion, and such multiple measurements are then processed to determine ion m/z and charge from which the ion mass can be calculated.

Single particle CDMS is a time consuming process which typically requires several hours to measure and obtain a mass spectrum. It is desirable to develop CDMS instruments and techniques which decrease sample analysis durations.

SUMMARY

The present disclosure may comprise one or more of the features recited in the attached claims, and/or one or more of the following features and combinations thereof. In a first aspect, a charge detection mass spectrometer (CDMS) may comprise an ion source configured to generate a beam of ions, a mass spectrometer configured to separate the generated beam of ions as a function of ion mass-to-charge ratio to produce a resulting beam of separated ions, an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, a first one of the pair of ions mirror defining an ion inlet aperture about the longitudinal axis through which the beam of separated ions enters the ELIT, at least one voltage source operatively coupled to the pair of ion mirrors and configured to produce voltages for selectively establishing electric fields therein configured to trap within the ELIT a plurality of ions in the entering beam of separated ions and to cause the plurality of trapped ions to oscillate back and forth between the pair of ion mirrors each time passing through the charge detection cylinder, and means for controlling a trajectory of the beam of separated ions entering the ion inlet aperture of the ELIT to cause the plurality of ions subsequently trapped within the ELIT to oscillate therein with a corresponding plurality of different planar ion oscillation trajectories angularly offset from one another about the longitudinal axis with each extending along the longitudinal axis and crossing the longitudinal axis in each of the pair of ion mirrors or a corresponding plurality of different cylindrical ion oscillation trajectories radially offset from one another about the longitudinal axis to form a plurality of nested cylindrical trajectories each extending along the longitudinal axis.

In a second aspect, an instrument for separating ions may comprise an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS) coupled in parallel with and to the ion dissociation stage such that the CDMS can receive ions exiting either of the first mass spectrometer and the ion dissociation stage, the CDMS comprising (i) at least one ion separation instrument configured to separate ions as a function of at least one molecular characteristic, (ii) an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, a first one of the pair of ions mirror defining an ion inlet aperture about the longitudinal axis through which the beam of separated ions enters the ELIT, (iii) at least one voltage source operatively coupled to the pair of ion mirrors and configured to produce voltages for selectively establishing electric fields therein configured to trap within the ELIT a plurality of ions in the entering beam of separated ions and to cause the plurality of trapped ions to oscillate back and forth between the pair of ion mirrors each time passing through the charge detection cylinder, and (iv) means for controlling a trajectory of the beam of separated ions entering the ion inlet aperture of the ELIT to cause the plurality of ions subsequently trapped within the ELIT to oscillate therein with a corresponding plurality of different planar ion oscillation trajectories angularly offset from one another about the longitudinal axis with each extending along the longitudinal axis and crossing the longitudinal axis in each of the pair of ion mirrors or a corresponding plurality of different cylindrical ion oscillation trajectories radially offset from one another about the longitudinal axis to form a plurality of nested cylindrical trajectories each extending along the longitudinal axis, wherein masses of precursor ions exiting the first mass spectrometer are measured using the CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

In a third aspect, a method is provided for simultaneously measuring at least two ions in a beam of ions supplied to an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, wherein a first one of the pair of ions mirror defines an ion inlet aperture about the longitudinal axis through which the supplied beam of ions enters the ELIT. The method may comprise controlling at least one voltage source to apply voltages to the pair of ion mirrors to establish an ion transmission electric field therein to pass the beam of ions supplied to the ion inlet aperture of the ELIT through each of the pair of ion mirrors and through the charge detection cylinder and through an ion exit defined by a second one of the pair of ion mirrors, wherein each ion transmission electric field is configured to focus ions passing therethrough toward the longitudinal axis, controlling the at least one voltage source to modify the voltages applied to the pair of ion mirrors to establish an ion reflection electric field therein to trap within the ELIT at least two of the ions in the beam of ions supplied to the ion inlet aperture of the ELIT, wherein each ion reflection electric field is configured to cause ions entering a respective one of the pair of ion mirrors from the charge detection cylinder to stop and accelerate in an opposite direction back through the charge detection cylinder and toward the other of the pair of ion mirrors while also focusing the ions toward the longitudinal axis, and controlling a trajectory of the beam of ions entering the ion inlet aperture of the ELIT to cause the at least two ions subsequently trapped within the ELIT to oscillate therein with at least two different planar ion oscillation trajectories angularly offset from one another about the longitudinal axis with each extending along the longitudinal axis and crossing the longitudinal axis in each of the pair of ion mirrors.

In a fourth aspect, a method is provided for simultaneously measuring at least two ions in a beam of ions supplied to an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, wherein a first one of the pair of ions mirror defines an ion inlet aperture about the longitudinal axis through which the supplied beam of ions enters the ELIT. The method may comprise controlling at least one voltage source to apply voltages to the pair of ion mirrors to establish an ion transmission electric field therein to pass the beam of ions supplied to the ion inlet aperture of the ELIT through each of the pair of ion mirrors and through the charge detection cylinder and through an ion exit defined by a second one of the pair of ion mirrors, wherein each ion transmission electric field is configured to focus ions passing therethrough toward the longitudinal axis, controlling the at least one voltage source to modify the voltages applied to the pair of ion mirrors to establish an ion reflection electric field therein to trap within the ELIT at least two of the ions in the beam of ions supplied to the ion inlet aperture of the ELIT, wherein each ion reflection electric field is configured to cause ions entering a respective one of the pair of ion mirrors from the charge detection cylinder to stop and accelerate in an opposite direction back through the charge detection cylinder and toward the other of the pair of ion mirrors while also focusing the ions toward the longitudinal axis, and controlling a trajectory of the beam of ions entering the ion inlet aperture of the ELIT to cause the at least two ions subsequently trapped within the ELIT to oscillate therein with at least two different cylindrical ion oscillation trajectories radially offset from one another about the longitudinal axis to form at least two nested cylindrical ion oscillation trajectories each extending along the longitudinal axis.

BRIEF DESCRIPTION OF THE DRAWINGS

FIG. 12A is a simplified block diagram of an embodiment of an ion separation instrument which may include the ELIT illustrated and described herein, and which may include the charge detection mass spectrometer illustrated and described herein, and which may include any number of ion processing instruments which may form part of the ion source upstream of the ELIT and/or which may include any number of ion processing instruments which may be disposed downstream of the ELIT to further process ion(s) exiting the ELIT.

FIG. 12B is a simplified block diagram of another embodiment of an ion separation instrument in which a multi-stage mass spectrometer instrument includes the CDMS and the ELIT, and which may also include an ion trajectory control apparatus as described herein.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to apparatuses and techniques for simultaneously analyzing multiple ions with an electrostatic linear ion trap (ELIT) detector of a charge detection mass spectrometer (CDMS) by controlling the trajectories of ions entering the ELIT in a manner which provides for simultaneous trapping and individual measurement of multiple ions each having a different oscillation trajectory within the ELIT. In one embodiment, the ion entrance trajectories may be controlled in a manner which favors a planar oscillation trajectory geometry within the ELIT in which the trapped ions have a very low likelihood of interacting with one another. In another embodiment, the ion entrance trajectories may be controlled in a manner which favors a cylindrical oscillation trajectory geometry within the ELIT in which the trapped ions do not significantly interact with one another. In any case, such simultaneous analysis of multiple ions with an ELIT may substantially reduce sample analysis times over that achievable using conventional single-ion trapping techniques.

With respect to the operation of an ELIT, and for purposes of this disclosure, the phrase "charge detection event" is defined as detection of a charge associated with an ion passing a single time through a charge detector of the ELIT, and the phrase "ion measurement event" is defined as a collection of charge detection events resulting from oscillation of an ion back and forth through the charge detector a selected number of times or for a selected time period. As the oscillation of an ion back and forth through the charge detector results from controlled trapping of the ion within the ELIT as will be described in detail below, the phrase "ion measurement event" may alternatively be referred to herein as an "ion trapping event" or simply as a "trapping event," and the phrases "ion measurement event," "ion trapping event", "trapping event" and variants thereof shall be understood to be synonymous with one another.

Figure 1:
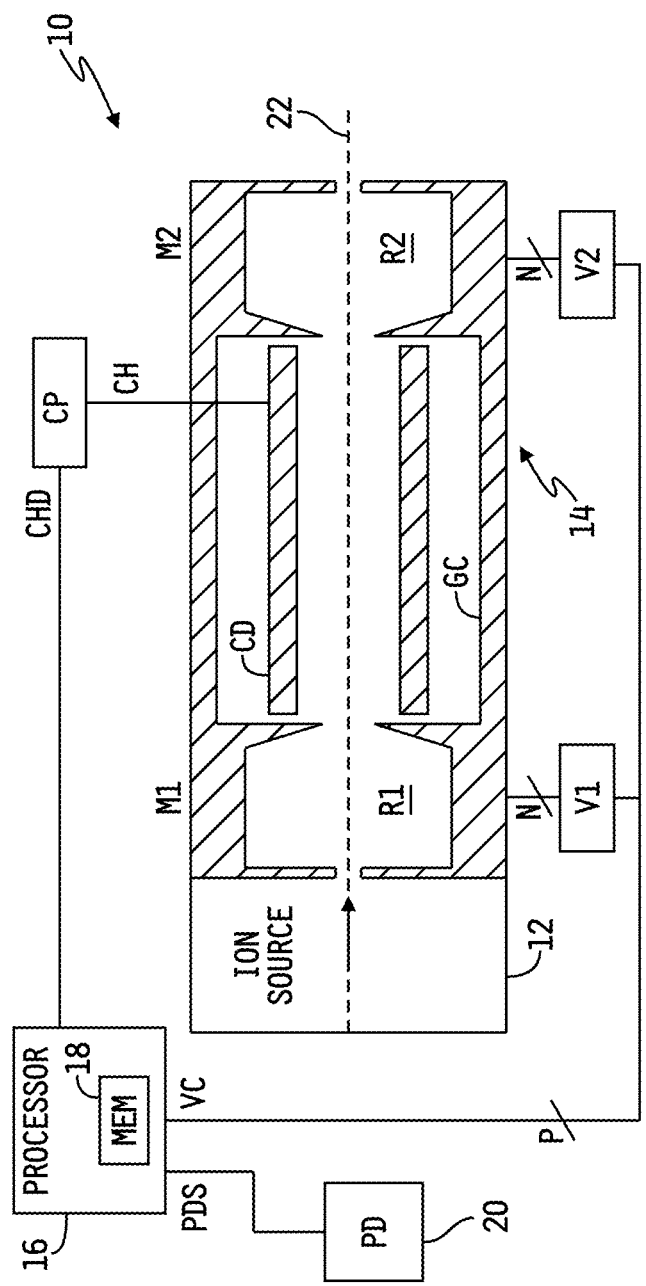
FIG. 1 is a simplified diagram of a CDMS system including an embodiment of an electrostatic linear ion trap (ELIT) with control and measurement components coupled thereto.

Referring to FIG. 1, a CDMS system 10 is shown including an embodiment of an electrostatic linear ion trap (ELIT) 14 with control and measurement components coupled thereto. In the illustrated embodiment, the CDMS system 10 includes an ion source 12 operatively coupled to an inlet of the ELIT 14. The ion source 12 may illustratively be or include any conventional device, apparatus or technique for generating ions from a sample, e.g., electrospray or other conventional ion generation device, and may further include, for example, one or more devices and/or instruments for separating ions, e.g., based on ion mass, ion mass-to-charge ratio, ion mobility or other molecular characteristic, one or more devices and/or instruments for filtering ions, e.g., based on ion mass-to-charge ratio, ion mobility or other molecular characteristic, one or more devices or instruments for collecting and/or storing ions, e.g., one or more ion traps, one or more devices and/or instruments for dissociating ions, one or more devices or instruments for normalizing or shifting charge states of ions according to one or more molecular characteristics, and/or any combination thereof arranged in any order relative to the direction of ion flow.

In the illustrated embodiment, the ELIT 14 illustratively includes a charge detector CD surrounded by a ground chamber or cylinder GC and operatively coupled to opposing ion mirrors M1, M2 respectively positioned at opposite ends thereof. The ion mirror M1 is operatively positioned between the ion source 12 and one end of the charge detector CD, and ion mirror M2 is operatively positioned at the opposite end of the charge detector CD. Each ion mirror M1, M2 defines a respective ion mirror region or cavity R1, R2 therein. The regions R1, R2 of the ion mirrors M1, M2, the charge detector CD, and the spaces between the charge detector CD and the ion mirrors M1, M2 together define a longitudinal axis 22 centrally therethrough which illustratively represents an ideal ion travel path through the ELIT 14 and between the ion mirrors M1, M2 as will be described in greater detail below.

In the illustrated embodiment, voltage sources V1, V2 are electrically connected to the ion mirrors M1, M2 respectively. Each voltage source V1, V2 illustratively includes one or more switchable DC voltage sources which may be controlled or programmed to selectively produce a number, N, of programmable or controllable voltages, wherein N may be any positive integer. Illustrative examples of such voltages will be described below with respect to FIGS. 2A and 2B to establish one of two different operating modes of each of the ion mirrors M1, M2 as will be described in detail below. In any case, ions move within the ELIT 14 close to the longitudinal axis 22 extending centrally through the charge detector CD and the ion mirrors M1, M2 under the influence of electric fields selectively established by the voltage sources V1, V2.

The voltage sources V1, V2 are illustratively shown electrically connected by a number, P, of signal paths to a conventional processor 16 including a memory 18 having instructions stored therein which, when executed by the processor 16, cause the processor 16 to control the voltage sources V1, V2 to produce desired DC output voltages for selectively establishing ion transmission and ion reflection electric fields, TEF, REF respectively, within the regions R1, R2 of the respective ion mirrors M1, M2. P may be any positive integer. In some alternate embodiments, either or both of the voltage sources V1, V2 may be programmable to selectively produce one or more constant output voltages. In other alternative embodiments, either or both of the voltage sources V1, V2 may be configured to produce one or more time-varying output voltages of any desired shape. It will be understood that more or fewer voltage sources may be electrically connected to the mirrors M1, M2 in alternate embodiments.

The charge detector CD is illustratively provided in the form of an electrically conductive charge detection cylinder which is electrically connected to a signal input of a charge sensitive preamplifier CP, and the signal output of the charge preamplifier CP is electrically connected to the processor 16. The voltage sources V1, V2 are illustratively controlled in a manner which causes ions to be introduced into the ELIT 14 from the ion source 12, and which selectively captures and confines an ion to oscillate therein such that the captured ion repeatedly passes through the charge detector CD. With an ion captured, i.e., trapped, within the ELIT 14 and oscillating back and forth between the ion mirrors M1, M2, the charge preamplifier CP is illustratively operable in a conventional manner to detect charges (CH) induced on the charge detection cylinder CD as the ion passes through the charge detection cylinder CD between the ion mirrors M1, M2, and to produce charge detection signals (CHD) corresponding thereto. A plurality of ion charge and oscillation period values are measured at the charge detector CD for each ion captured therein, and the results are recorded and processed to determine ion charge and mass values as will be described in greater detail below.

The processor 16 is further illustratively coupled to one or more peripheral devices 20 (PD) for providing peripheral device signal input(s) (PDS) to the processor 16 and/or to which the processor 16 provides signal peripheral device signal output(s) (PDS). In some embodiments, the peripheral devices 20 include at least one of a conventional display monitor, a printer and/or other output device, and in such embodiments the memory 18 has instructions stored therein which, when executed by the processor 16, cause the processor 16 to control one or more such output peripheral devices 20 to display and/or record analyses of the stored, digitized charge detection signals.

Figure 2A:
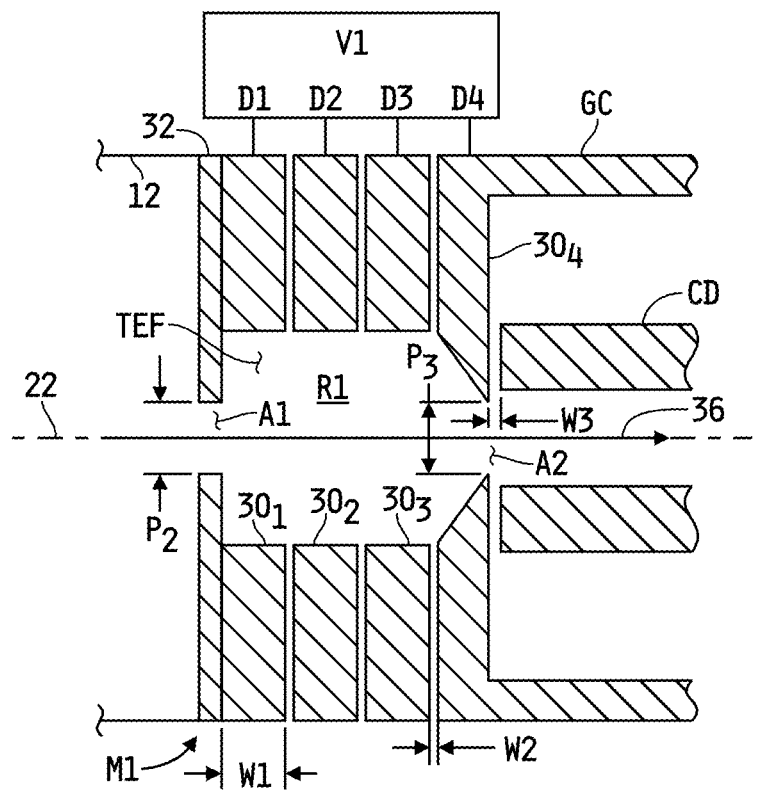
FIG. 2A is a magnified view of the ion mirror M1 of the ELIT illustrated in FIG. 1 in which the mirror electrodes of M1 are controlled to produce an ion transmission electric field therein.
Figure 2B:
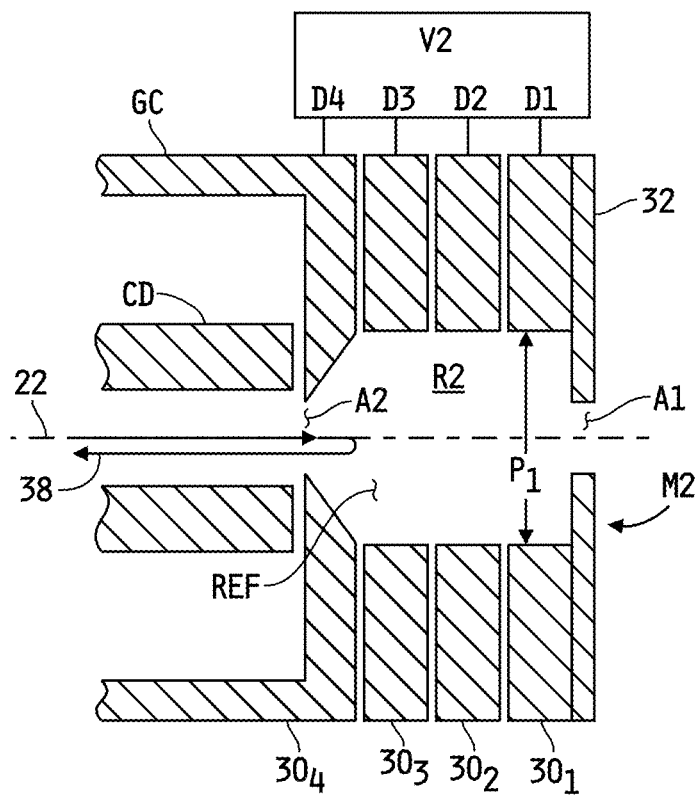
FIG. 2B is a magnified view of the ion mirror M2 of the ELIT illustrated in FIG. 1 in which the mirror electrodes of M2 are controlled to produce an ion reflection electric field therein.

Referring now to FIGS. 2A and 2B, embodiments are shown of the ion mirrors M1, M2 respectively of the ELIT 14 depicted in FIG. 1. Illustratively, the ion mirrors M1, M2 are identical to one another in that each includes a cascaded arrangement of 4 spaced-apart, electrically conductive mirror electrodes. For each of the ion mirrors M1, M2, a first mirror electrode $30_1$ has a thickness W1 and defines a passageway centrally therethrough of diameter P1. An endcap 32 is affixed or otherwise coupled to an outer surface of the first mirror electrode $30_1$ and defines an aperture A1 centrally therethrough which serves as an ion entrance and/or exit to and/or from the corresponding ion mirror M1, M2 respectively. In the case of the ion mirror M1, the endcap 32 is coupled to, or is part of, an ion exit of the ion source 12 illustrated in FIG. 1. The aperture A1 for each endcap 32 illustratively has a diameter P2.

A second mirror electrode $30_2$ of each ion mirror M1, M2 is spaced apart from the first mirror electrode $30_1$ by a space having width W2. The second mirror electrode $30_2$, like the mirror electrode $30_1$, has thickness W1 and defines a passageway centrally therethrough of diameter P2. A third mirror electrode $30_3$ of each ion mirror M1, M2 is likewise spaced apart from the second mirror electrode $30_2$ by a space of width W2. The third mirror electrode $30_3$ has thickness W1 and defines a passageway centrally therethrough of width P1.

A fourth mirror electrode $30_4$ is spaced apart from the third mirror electrode $30_3$ by a space of width W2. The fourth mirror electrode $30_4$ illustratively has a thickness of W1 and is formed by a respective end of the ground cylinder, GC disposed about the charge detector CD. The fourth mirror electrode $30_4$ defines an aperture A2 centrally therethrough which is illustratively conical in shape and increases linearly between the internal and external faces of the ground cylinder GC from a diameter P3 defined at the internal face of the ground cylinder GC to the diameter P1 at the external face of the ground cylinder GC (which is also the internal face of the respective ion mirror M1, M2).

The spaces defined between the mirror electrodes $30_1$-$30_4$ may be voids in some embodiments, i.e., vacuum gaps, and in other embodiments such gaps may be filled with one or more electrically non-conductive, e.g., dielectric, materials. The mirror electrodes $30_1$-$30_4$ and the endcaps 32 are axially aligned, i.e., collinear, such that the longitudinal axis 22 passes centrally through each aligned passageway and also centrally through the apertures A1, A2. In embodiments in which the spaces between the mirror electrodes $30_1$-$30_4$ include one or more electrically non-conductive materials, such materials will likewise define respective passageways therethrough which are axially aligned, i.e., collinear, with the passageways defined through the mirror electrodes $30_1$-$30_4$ and which illustratively have diameters of P2 or greater. Illustratively, P1>P3>P2, although in other embodiments other relative diameter arrangements are possible.

A region R1 is defined between the apertures A1, A2 of the ion mirror M1, and another region R2 is likewise defined between the apertures A1, A2 of the ion mirror M2. The regions R1, R2 are illustratively identical to one another in shape and in volume.

As described above, the charge detector CD is illustratively provided in the form of an elongated, electrically conductive cylinder positioned and spaced apart between corresponding ones of the ion mirrors M1, M2 by a space of width W3. In one embodiment, W1>W3>W2, and P1>P3>P2, although in alternate embodiments other relative width arrangements are possible. In any case, the longitudinal axis 22 illustratively extends centrally through the passageway defined through the charge detection cylinder CD, such that the longitudinal axis 22 extends centrally through the combination of the ion mirrors M1, M2 and the charge detection cylinder CD. In operation, the ground cylinder GC is illustratively controlled to ground potential such that the fourth mirror electrode $30_4$ of each ion mirror M1, M2 is at ground potential at all times. In some alternate embodiments, the fourth mirror electrode $30_4$ of either or both of the ion mirrors M1, M2 may be set to any desired DC reference potential, or to a switchable DC or other time-varying voltage source.

In the embodiment illustrated in FIGS. 2A and 2B, the voltage sources V1, V2 are each configured to each produce four DC voltages D1-D4, and to supply the voltages D1-D4 to a respective one of the mirror electrodes $30_1$-$30_4$ of the respective ion mirror M1, M2. In some embodiments in which one or more of the mirror electrodes $30_1$-$30_4$ is to be held at ground potential at all times, the one or more such mirror electrodes $30_1$-$30_4$ may alternatively be electrically connected to the ground reference of the respective voltage supply V1, V2 and the corresponding one or more voltage outputs D1-D4 may be omitted. Alternatively or additionally, in embodiments in which any two or more of the mirror electrodes $30_1$-$30_4$ are to be controlled to the same non-zero DC values, any such two or more mirror electrodes $30_1$-$30_4$ may be electrically connected to a single one of the voltage outputs D1-D4 and superfluous ones of the output voltages D1-D4 may be omitted.

Each ion mirror M1, M2 is illustratively controllable and switchable, by selective application of the voltages D1-D4, between an ion transmission mode (FIG. 2A) in which the voltages D1-D4 produced by the respective voltage source V1, V2 establishes an ion transmission electric field (TEF) in the respective region R1, R2 thereof, and an ion reflection mode (FIG. 2B) in which the voltages D1-D4 produced by the respect voltage source V1, V2 establishes an ion reflection electric field (REF) in the respective region R1, R2 thereof. As illustrated by example in FIG. 2A, once ions from the ion source 12 fly into region R1 of the ion mirror M1 through the inlet aperture A1 of the ion mirror M1, the ions become focused towards the longitudinal axis 22 of the ion trap by an ion transmission electric field TEF established in the region R1 of the ion mirror M1 via selective control of the voltages D1-D4 of V1. As a result of the focusing effect of the transmission electric field in region R1 of the ion mirror M1 on the ion trajectory, ions exiting the region R1 of the ion mirror M1 through the aperture A2 of ion mirror M1 attain a narrow trajectory through the charge detector CD, i.e., so as to maintain the path of ion travel through the charge detector CD close to the longitudinal axis 22. An identical ion transmission electric field TEF may be selectively established within the region R2 of the ion mirror M2 via like control of the voltages D1-D4 of the voltage source V2. In the ion transmission mode, ions entering the region R2 from the charge detection cylinder CD via the aperture A2 of M2 are focused towards the longitudinal axis 22 by the ion transmission electric field TEF within the region R2 through the exit aperture A1 of the ion mirror M2.

As illustrated by example in FIG. 2B, an ion reflection electric field REF established in the region R2 of the ion mirror M2 via selective control of the voltages D1-D4 of V2 acts to decelerate and stop ions entering the ion region R2 from the charge detection cylinder CD via the ion inlet aperture A2 of M2, to immediately accelerate the stopped ions in the opposite direction back through the aperture A2 of M2 and into the end of the charge detection cylinder CD adjacent to M2 as depicted by the ion trajectory 38, and to focus the ions toward the central, longitudinal axis 22 within the region R2 of the ion mirror M2 so as to maintain a narrow trajectory of ions through the charge detector CD. An identical ion reflection electric field REF may be selectively established within the region R1 of the ion mirror M1 via like control of the voltages D1-D4 of the voltage source V1. In the ion reflection mode, ions entering the region R1 from the charge detection cylinder CD via the aperture A2 of M1 are decelerated and stopped by the ion reflection electric field REF established within the region R1, then accelerated in the opposite direction back through the aperture A2 of M1 and into the end of the charge detection cylinder CD adjacent to M1, and focused toward the central, longitudinal axis 22 within the region R1 of the ion mirror M1 so as to maintain a narrow trajectory of ions through the charge detector CD. Ions that traverse the length of the ion trap and are reflected by the ion reflection electric field REF in the ion regions R1 and R2 in a manner that enables the ions to continue traveling back and forth along the length of the trap are considered trapped.

Example sets of output voltages D1-D4 produced by the voltage sources V1, V2 to control a respective ion mirror M1, M2 to and between the ion transmission and reflection modes described above are shown in TABLE I below. It will be understood that the following values of D1-D4 are provided only by way of example, and that other values of one or more of D1-D4 may alternatively be used.

TABLE I

| Ion Mirror Operating Mode | Output Voltages (volts DC) |
| --- | --- |
| Transmission | V1: D1 = 0, D2 = 95, D3 = 135, D4 = 0 |
|  | V2: D1 = 0, D2 = 95, D3 = 135, D4 = 0 |
| Reflection | V1: D1 = 190, D2 = 125, D3 = 135, D4 = 0 |
|  | V2: D1 = 190, D2 = 125, D3 = 135, D4 = 0 |

While the ion mirrors M1, M2 and the charge detection cylinder CD are illustrated in FIGS. 1-2B as defining cylindrical passageways therethrough, it will be understood that in alternate embodiments either or both of the ion mirrors M1, M2 and/or the charge detection cylinder CD may define non-cylindrical passageways therethrough such that one or more of the passageway(s) through which the longitudinal axis 22 centrally passes represents a cross-sectional area and profile that is not circular. In still other embodiments, regardless of the shape of the cross-sectional profiles, the cross-sectional areas of the passageway defined through the ion mirror M1 may be different from the passageway defined through the ion mirror M2.

Figure 3:
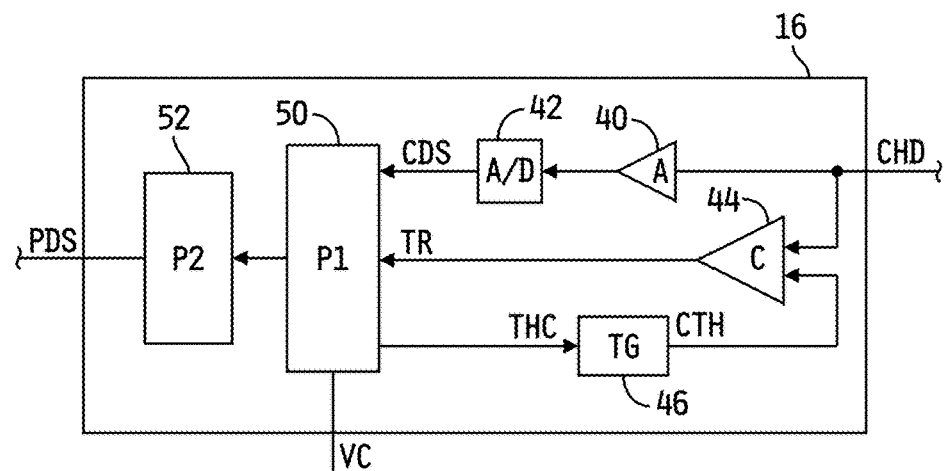
FIG. 3 is a simplified diagram of an embodiment of the processor illustrated in FIG. 1.

Referring now to FIG. 3, an embodiment is shown of the processor 16 illustrated in FIG. 1. In the illustrated embodiment, the processor 16 includes a conventional amplifier circuit 40 having an input receiving the charge detection signal CHD produced by the charge preamplifier CP and an output electrically connected to an input of a conventional Analog-to-Digital (A/D) converter 42. An output of the A/D converter 42 is electrically connected to a first computing device or circuit 50 (P1). The amplifier 40 is operable in a conventional manner to amplify the charge detection signal CHD produced by the charge preamplifier CP, and the A/D converter is, in turn, operable in a conventional manner to convert the amplified charge detection signal to a digital charge detection signal CDS. The computing device 50 illustratively includes or is coupled to a one or more conventional memory units, and the computing device 50 is illustratively operable to store therein the charge detection signals CDS for each charge detection event in an ion measurement event such that an ion measurement event record stored in the memory of the processor circuit 50 includes multiple charge detection event measurements.

The processor 16 illustrated in FIG. 3 further includes a conventional comparator 44 having a first input receiving the charge detection signal CHD produced by the charge preamplifier CP, a second input receiving a threshold voltage CTH produced by a threshold voltage generator (TG) 46 and an output electrically connected to the computing device 50. The comparator 44 is illustratively operable in a conventional manner to produce a trigger signal TR at the output thereof which is dependent upon the magnitude of the charge detection signal CDH relative to the magnitude of the threshold voltage CTH. In one embodiment, for example, the comparator 44 is operable to produce an "inactive" trigger signal TR at or near a reference voltage, e.g., ground potential, as long as CHD is less than CTH, and is operable to produce an "active" TR signal at or near a supply voltage of the circuitry 40, 42, 44, 46, 50 when CHD is at or exceeds CTH. In alternate embodiments, the comparator 44 may be operable to produce an "inactive" trigger signal TR at or near the supply voltage as long as CHD is less than CTH, and is operable to produce an "active" trigger signal TR at or near the reference potential when CHD is at or exceeds CTH. Those skilled in the art will recognize other differing trigger signal magnitudes and/or differing trigger signal polarities that may be used to establish the "inactive" and "active" states of the trigger signal TR so long as such differing trigger signal magnitudes and/or different trigger signal polarities are distinguishable by the computing device 50, and it will be understood that any such other different trigger signal magnitudes and/or differing trigger signal polarities are intended to fall within the scope of this disclosure. In any case, the comparator 44 may additionally be designed in a conventional manner to include a desired amount of hysteresis to prevent rapid switching of the output between the reference and supply voltages.

In the illustrated embodiment, the computing device 50 is operable, i.e., programmed, to control the threshold voltage generator 46 to produce the threshold voltage CTH. In one embodiment, the threshold voltage generator 46 is illustratively implemented in the form of a conventional controllable DC voltage source configured to be responsive to a digital threshold control signal THC, e.g., in the form of a single serial digital signal or multiple parallel digital signals, to produce an analog threshold voltage CTH having a polarity and a magnitude defined by the digital threshold control signal THC. In alternate embodiments, the threshold voltage generator 46 may be provided in the form of a conventional digital-to-analog (D/A) converter responsive to a serial or parallel digital threshold voltage TCH to produce an analog threshold voltage CTH having a magnitude, and in some embodiments a polarity, defined by the digital threshold control signals THC. In some such embodiments, the D/A converter may form part of the processor circuit 50. Those skilled in the art will recognize other conventional circuits and techniques for selectively producing the threshold voltage CTH of desired magnitude and/or polarity, and it will be understood that any such other conventional circuits and/or techniques are intended to fall within the scope of this disclosure.

The computing device 50 is operable to control the voltage sources V1, V2 as described above with respect to FIGS. 2A, 2B to selectively establish ion transmission and reflection fields within the regions R1, R2 of the ion mirrors M1, M2 respectively. In one embodiment, the computing device 50 is illustratively provided in the form of a field programmable gate array (FPGA) programmed as just described to collect and store charge detection signals CDS for charge detection events and for ion measurement events, to produce the threshold control signal(s) THC from which the magnitude and/or polarity of the threshold voltage CTH is determined or derived, and to control the voltage sources V1, V2 based on the charge detection signals CHD relative to the threshold voltage CTH as determined by monitoring the trigger output signal TR produced by the comparator 44. In this embodiment, the memory 18 described with respect to FIG. 1 is integrated into, and forms part of, the programming of the FPGA. In alternate embodiments, the computing device 50 may include and/or be provided in the form of one or more conventional microprocessors or controllers and one or more accompanying memory units incorporated therein or coupled thereto and having instructions stored therein which, when executed by the one or more microprocessors or controllers, cause the one or more microprocessors or controllers to operate as just described. In other alternate embodiments, the computing device 50 may be implemented purely in the form of one or more conventional or application-specific hardware circuits designed to operate as described above, or as a combination of one or more such hardware circuits and at least one microprocessor or controller operable to execute instructions stored in memory to operate as described above.

In any case, the embodiment of the processor 16 depicted in FIG. 3 further illustratively includes a second computing device 52 coupled to the first computing device 50 and also to the one or more peripheral devices 20 illustrated in FIG. 1. In some alternate embodiments, the computing device 52 may include at least one of the one or more peripheral devices 20. In any case, the computing device 52 is illustratively operable to process the ion measurement event information stored by the first computing device 50 to determine ion mass information. The computing device 52 may be or include one or more conventional microprocessors and/or controllers, one or more programmable circuits, e.g., one or more field-programmable gate arrays, and/or one or more application-specific integrated circuits (ASICs). In some embodiments, the computing device 52 may be provided in the form of any conventional computer or computing device capable of processing the ion measurement event information, i.e., having sufficient computing power, to determine, display, store and conduct at least some amount of analysis of ion mass information. In one embodiment, the computing device 52 may be provided or included in the form of a conventional personal computer (PC), although in other embodiments the computing device 52 may be or be included in one or more computers or computing devices with greater or lesser computing power.

Figure 4A:
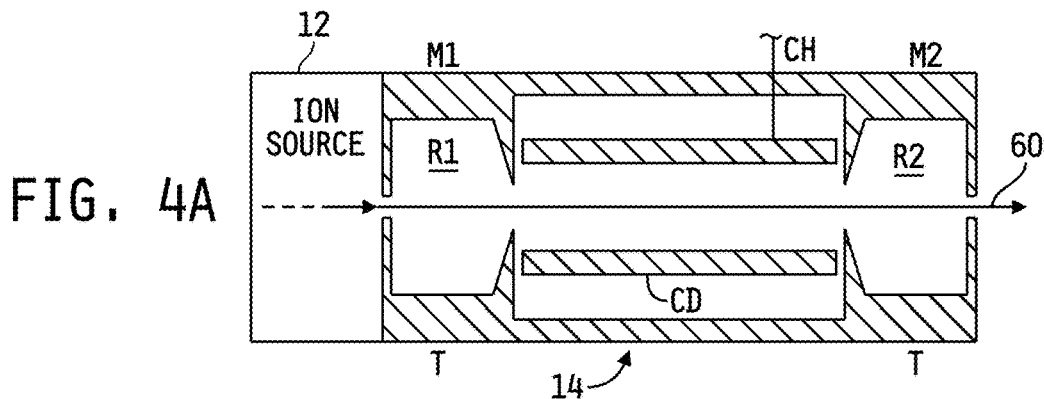
FIGS. 4A-4C are simplified diagrams of the ELIT of FIG. 1 demonstrating sequential control and operation of the ion mirrors to capture at least one ion within the ELIT and to cause the ion(s) to oscillate back and forth between the ion mirrors and through the charge detection cylinder to measure and record multiple charge detection events.
Figure 4B:
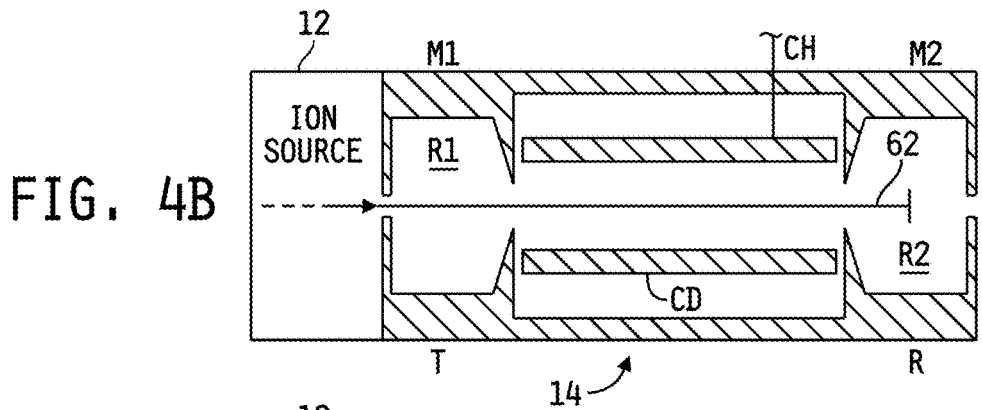
Figure 4C:
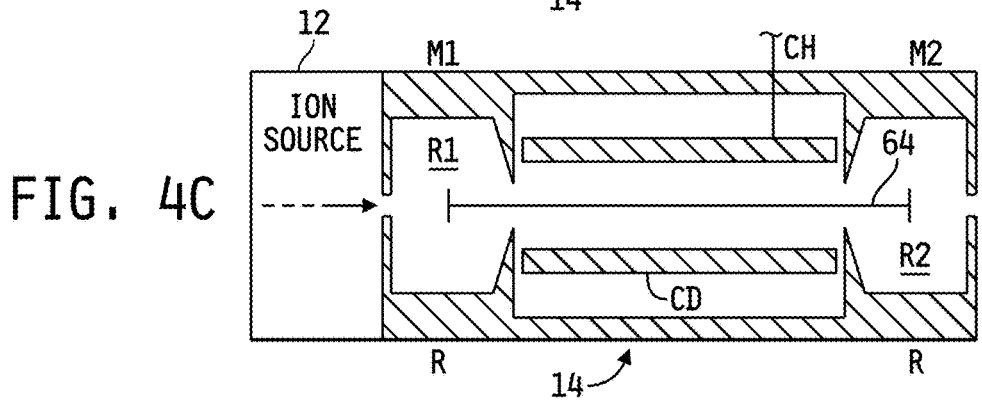

The voltage sources V1, V2 are illustratively controlled by the computing device 50 in a manner which selectively establishes ion transmission and ion reflection electric fields in the region R1 of the ion mirror M1 and in the region R2 of the ion mirror M2 to cause an ion to be introduced into the ELIT 14 from the ion source 12, and to then cause the introduced ion to be selectively captured and confined to oscillate within the ELIT 14 such that the captured ion repeatedly passes through the charge detector CD between M1 and M2. Referring to FIGS. 4A-4C, simplified diagrams of the ELIT 14 of FIG. 1 are shown depicting an example of such sequential control and operation of the ion mirrors M1, M2 of the ELIT 14. In the following example, the computing device 50 will be described as controlling the operation of the voltage sources V1, V2 in accordance with its programming, although it will be understood that in alternate embodiments the operation of the voltage source V1 and/or the operation of the voltage source V1 may be controlled, at least in part, by the computing device 52 in accordance with its programming.

As illustrated in FIG. 4A, the ELIT control sequence begins with the computing device 50 controlling the voltage source V1 to control the ion mirror M1 to the ion transmission mode of operation (T) by establishing an ion transmission field within the region R1 of the ion mirror M1, and also controlling the voltage source V2 to control the ion mirror M2 to the ion transmission mode of operation (T) by likewise establishing an ion transmission field within the region R2 of the ion mirror M2. As a result, an ion generated by the ion source 12 is drawn into the ion mirror M1 and transmitted, i.e., accelerated, through M1 into the charge detection cylinder CD by the ion transmission field established in the region R1. The ion then passes through the charge detection cylinder CD and into the ion mirror M2 where the ion transmission field established within the region R2 of M2 transmits, i.e., accelerates, the ion through the exit aperture A1 of M2 as illustrated by the ion trajectory 60 depicted in FIG. 4A.

Referring now to FIG. 4B, after both of the ion mirrors M1, M2 have been operating in ion transmission operating mode for a selected time period and/or until successful ion transmission therethrough has been achieved, e.g., by monitoring the charge detection signals CDS captured by the computing device 50, the computing device 50 is illustratively operable to control the voltage source V2 to control the ion mirror M2 to the ion reflection mode (R) of operation by establishing an ion reflection field within the region R2 of the ion mirror M2, while maintaining the ion mirror M1 in the ion transmission mode (T) of operation as shown. As a result, an ion generated by the ion source 12 flies into the ion mirror M1 and is transmitted through M1 into the charge detection cylinder CD by the ion transmission field established in the region R1 as just described with respect to FIG.

4A. The ion then passes through the charge detection cylinder CD and into the ion mirror M2 where the ion reflection field established within the region R2 of M2 reflects ions to cause them to travel in the opposite direction and back into the charge detection cylinder CD, as illustrated by the ion trajectory 62 in FIG. 4B.

Referring now to FIG. 4C, after the ion reflection electric field has been established in the region R2 of the ion mirror M2 and the ion is moving within the ELIT 14, the processor circuit 50 is operable to control the voltage source V1 to control the ion mirror M1 to the ion reflection mode (R) of operation by establishing an ion reflection field within the region R1 of the ion mirror M1, while maintaining the ion mirror M2 in the ion reflection mode (R) of operation in order to trap the ion within the ELIT 14. In some embodiments, the computing device 50 is illustratively operable, i.e., programmed, to control the ELIT 14 in a "random trapping mode" or "continuous trapping mode" in which the computing device 50 is operable to control the ion mirror M1 to the reflection mode (R) of operation after the ELIT 14 has been operating in the state illustrated in FIG. 4B, i.e., with M1 in ion transmission mode and M2 in ion reflection mode, for a selected time period. Until the selected time period has elapsed, the ELIT 14 is controlled to operate in the state illustrated in FIG. 4B.

The probability of trapping an ion in the ELIT 14 is relatively low using the random trapping mode of operation due to the timed control of M1 to the ion reflection mode of operation without any confirmation that an ion is contained within the ELIT 14. The number of trapped ions within the ELIT 14 during the random trapping mode of operation follows a Poisson distribution and, with the ion inlet signal intensity adjusted to maximize the number of single ion trapping events, it can be shown that only about 37% of trapping events in the random trapping mode can contain a single ion. If the ion inlet signal intensity is too small, most of the trapping events will be empty, and if it is too large most will contain multiple ions.

In other embodiments, the computing device 50 is operable, i.e., programmed, to control the ELIT 14 in a "trigger trapping mode" which illustratively carries a substantially greater probability of trapping a single ion therein. In a first version of the trigger trapping mode, the computing device 50 is operable to monitor the trigger signal TR produced by the comparator 44 and to control the voltage source V1 to control the ion mirror M1 to the reflection mode (R) of operation to trap an ion within the ELIT 14 if/when the trigger signal TR changes the "inactive" to the "active" state thereof. In some embodiments, the processor circuit 50 may be operable to control the voltage source V1 to control the ion mirror M1 to the reflection mode (R) immediately upon detection of the change of state of the trigger signal TR, and in other embodiments the processor circuit 50 may be operable to control the voltage source V1 to control the ion mirror M1 to the reflection mode (R) upon expiration of a predefined or selectable delay period following detection of the change of state of the trigger signal TR. In any case, the change of state of the trigger signal TR from the "inactive" state to the "active" state thereof results from the charge detection signal CHD produced by the charge preamplifier CP reaching or exceeding the threshold voltage CTH, and therefore corresponds to detection of a charge induced on the charge detection cylinder CD by an ion contained therein. With an ion thus contained within the charge detection cylinder CD, control by the computing device 50 of the voltage source V1 to control the ion mirror M1 to the reflection mode (R) of operation results in a substantially improved probability, relative to the random trapping mode, of trapping a single ion within the ELIT 14. Thus, when an ion has entered the ELIT 14 via the ion mirror M1 and is detected as either passing the first time through the charge detection cylinder CD toward the ion mirror M2 or as passing back through the charge detection cylinder CD after having been reflected by the ion reflection field established within the region R2 of the ion mirror M2 as illustrated in FIG. 4B, the ion mirror M1 is controlled to the reflection mode (R) as illustrated in FIG. 4C to trap the ion within the ELIT 14. It is also desirable to optimize the signal intensity with trigger trapping as briefly described above with respect to the random trapping mode of operation. In trigger trapping mode with optimized ion inlet signal intensity, for example, it has been shown that trapping efficiency, defined as the ratio between single-ion trapping events and all acquired trapping events, can approach 90% as compared to 37% with random trapping. However, if the ion inlet signal intensity is too large the trapping efficiency will be less than 90% and it will be necessary to reduce the ion inlet signal intensity.

In a second version of the trigger trapping mode, the process or step illustrated in FIG. 4B is omitted or bypassed, and with the ELIT 14 operating as illustrated in FIG. 4A the computing device 50 is operable to monitor the trigger signal TR produced by the comparator 44 and to control both voltage sources V1, V2 to control the respective ion mirrors M1, M2 to the reflection mode (R) of operation to trap or capture an ion within the ELIT 14 if/when the trigger signal TR changes the "inactive" to the "active" state thereof. Thus, when an ion has entered the ELIT 14 via the ion mirror M1 and is detected as passing the first time through the charge detection cylinder CD toward the ion mirror M2 as illustrated in FIG. 4A, the ion mirrors M1 and M2 are both controlled to the reflection mode (R) as illustrated in FIG. 4C to trap the ion within the ELIT 14.

In any case, with both of the ion mirrors M1, M2 controlled to the ion reflection operating mode (R) to trap an ion within the ELIT 14, the ion is caused by the opposing ion reflection fields established in the regions R1 and R2 of the ion mirrors M1 and M2 respectively to oscillate back and forth between the ion mirrors M1 and M2, each time passing through the charge detection cylinder CD as illustrated by the ion trajectory 64 depicted in FIG. 4C. In one embodiment, the computing device 50 is operable to maintain the operating state illustrated in FIG. 4C until the trapped ion passes through the charge detection cylinder CD a selected number of times. In an alternate embodiment, the computing device 50 is operable to maintain the operating state illustrated in FIG. 4C for a selected time period after controlling M1 (and M2 in some embodiments) to the ion reflection mode (R) of operation. In either embodiment, the ion detection event information resulting from each pass by the ion through the charge detection cylinder CD is temporarily stored in or by the computing device 50. When the ion has passed through the charge detection cylinder CD a selected number of times or has oscillated back-and-forth between the ion mirrors M1, M2 for a selected period of time, the total number of ion detection events stored in or by the computing device 50 defines an ion measurement event and, upon completion, the ion measurement event is passed to, or retrieved by, the computing device 52. The sequence illustrated in FIGS. 4A-4C then returns to that illustrated in FIG. 4A where the voltage sources V1, V2 are controlled by the computing device 50 as described above to control the ion mirrors M1, M2 respectively to the ion transmission mode (T) of operation by establishing an ion transmission fields within the regions R1, R2 of the ion mirrors M1, M2 respectively. The illustrated sequence then repeats for as many times as desired.

In one embodiment, the ion measurement event data are processed by computing, e.g., with the computing device 52 or with the computing device 50, a Fourier Transform of the recorded collection of charge detection events, i.e., of the recorded ion measurement event data. Illustratively, the computing device 52 is operable to compute such a Fourier Transform using any conventional digital Fourier Transform (DFT) technique such as for example, but not limited to, a conventional Fast Fourier Transform (FFT) algorithm. In any case, the computing device 52 is then illustratively operable to compute an ion mass-to-charge ratio value (m/z), an ion charge value (z) and ion mass values (m), each as a function of the computed Fourier Transform. The computing device 52 is illustratively operable to store the computed results in the memory 18 and/or to control one or more of the peripheral devices 20 to display the results for observation and/or further analysis.

It is generally understood that the mass-to-charge ratio (m/z) of ion(s) oscillating back and forth between opposing ion mirrors M1, M2 of an ELIT 14 is inversely proportional to the square of the fundamental frequency ff of the oscillating ion(s) according to the equation:

$$m/z = C/ff2,$$

where C is a constant that is a function of the ion energy and also a function of the dimensions of the respective ELIT 14, and the fundamental frequency ff is determined directly from the computed Fourier Transform in a conventional manner. The value of the ion charge, z, is proportional to the magnitude FTMAG of the FT fundamental frequency, taking into account the number of ion oscillation cycles. In some cases, the magnitude(s) of one or more of the harmonic frequencies of the FFT may be added to the magnitude of the fundamental frequency for purposes of determining the ion charge, z. In any case, ion mass, m, is then calculated as a product of m/z and z. The processor circuit 52 is thus operable to compute m/z=C/ff2, z=F(FTMAG) and m=(m/z)(z).

Multiple, e.g., hundreds or thousands or more, ion trapping events are typically carried out for any particular sample from which the ions are generated by the ion source 12, and ion mass-to-charge, ion charge and ion mass values are determined/computed for each such ion trapping event. The ion mass-to-charge, ion charge and ion mass values for such multiple ion trapping events are, in turn, combined to form spectral information relating to the sample. Such spectral information may illustratively take different forms, examples of which include, but are not limited to, ion count vs. mass-to-charge ratio, ion charge vs. ion mass (e.g., in the form of an ion charge/mass scatter plot), ion count vs. ion mass, ion count vs. ion charge, or the like.

Charge detection mass spectrometry (CDMS) is conventionally a single-ion analysis technique in which an ion is directed into an ion detection or measurement stage for measurement of the ion's charge and mass-to-charge ratio (m/z) from which the ion's mass is then determined. This process is repeated multiple times, e.g., hundreds or thousands of times, to produce a mass spectrum of the sample being analyzed. The ion detection or measurement stage may take any of several different forms including, for example, but not limited to an orbitrap mass analyzer, an electrostatic linear ion trap (ELIT) or other single ion measurement stage or instrument. In the case of an ELIT of any design, including that illustrated in FIGS. 1-4C and described in detail above, ions entering the ELIT are typically tightly focused toward the center of the ion inlet aperture such that their entrance trajectories are generally collinear with the longitudinal axis of the ELIT. In conventional ELIT operation, only single ion trapping events are analyzed because two or more trapped ions oscillating back and forth through the ELIT typically have an unacceptably high probability of interacting with one another in a manner which adversely influences the stabilities of their oscillation trajectories within the ELIT, thereby leading to inaccurate m/z and charge measurements.

In order to accurately measure the m/z and charge of an ion in an ELIT, its longitudinal oscillation frequency must be as stable as possible. When multiple ions enter into and are trapped in an ELIT, the trapped ions exert a repulsive force on one another that is proportional to the distance between them. This repulsive force deflects the ion oscillation trajectories within the ELIT, and as ions exchange momentums as a result of such interactions the energies of the oscillating ions also change. Ion oscillation trajectory and energy fluctuations during trapping events are undesirable because they decrease the certainty with which the ion oscillation frequencies can be determined, thereby decreasing the accuracy of the m/z measurements. Ion oscillation trajectory fluctuations also decrease the certainty in ion charge determinations as such fluctuations can affect the distance of ion penetration into the regions R1, R2 of the ion mirrors M1, M2, thereby changing the duty cycle of the charge detection signal CH (see, e.g., FIGS. 4A-4C) and decreasing the certainty in the distributions of the signal harmonics.

Figure 5A:
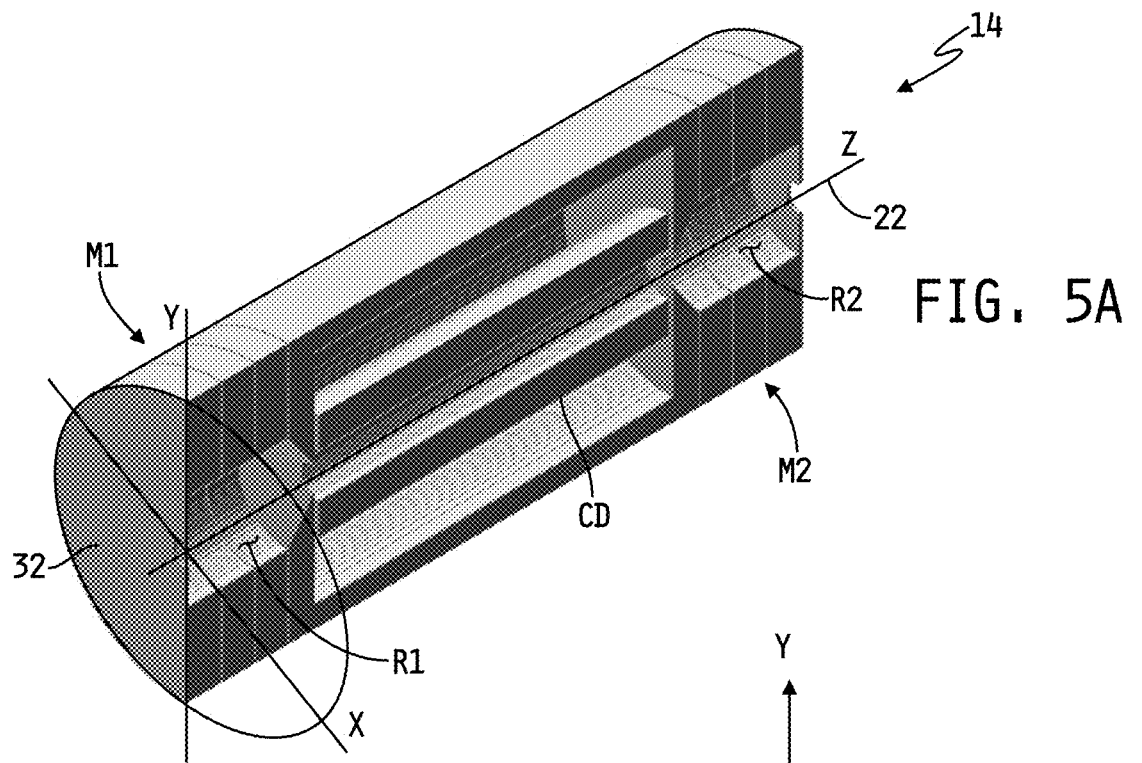
FIG. 5A is a simplified perspective sectional view of the ELIT of FIGS. 1-2B showing a 3-dimensional Cartesian coordinate system superimposed thereon with the origin of the coordinate system positioned at the ion inlet of the ELIT.
Figure 5B:
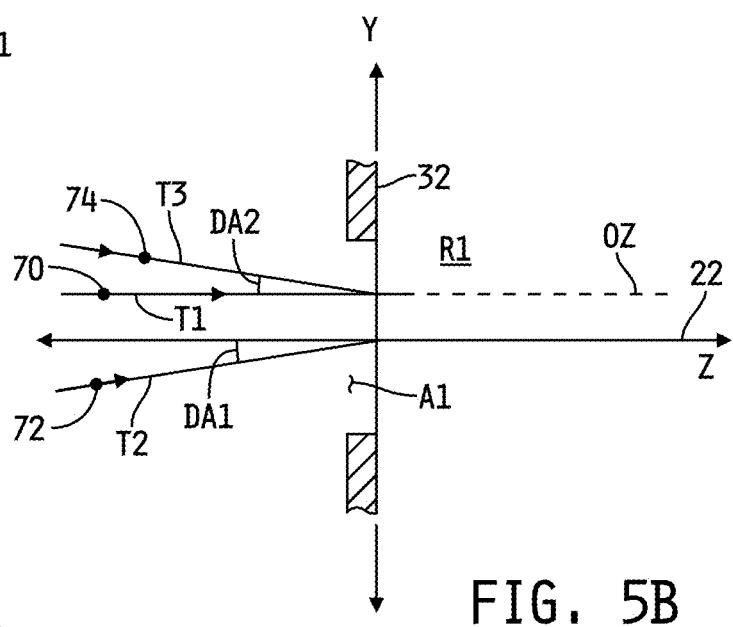
FIG. 5B is a magnified view of a portion of the ion inlet of the ELIT of FIG. 5A as viewed along the Y-Z plane of the illustrated coordinate system.
Figure 5C:
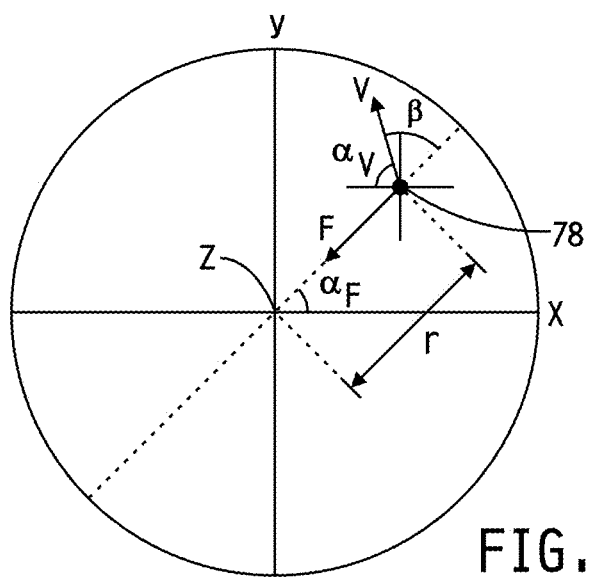
FIG. 5C is a magnified view of a portion of the ion inlet of the ELIT of FIG. 5A as viewed along the X-Y plane of the illustrated coordinate system.
Figure 7:
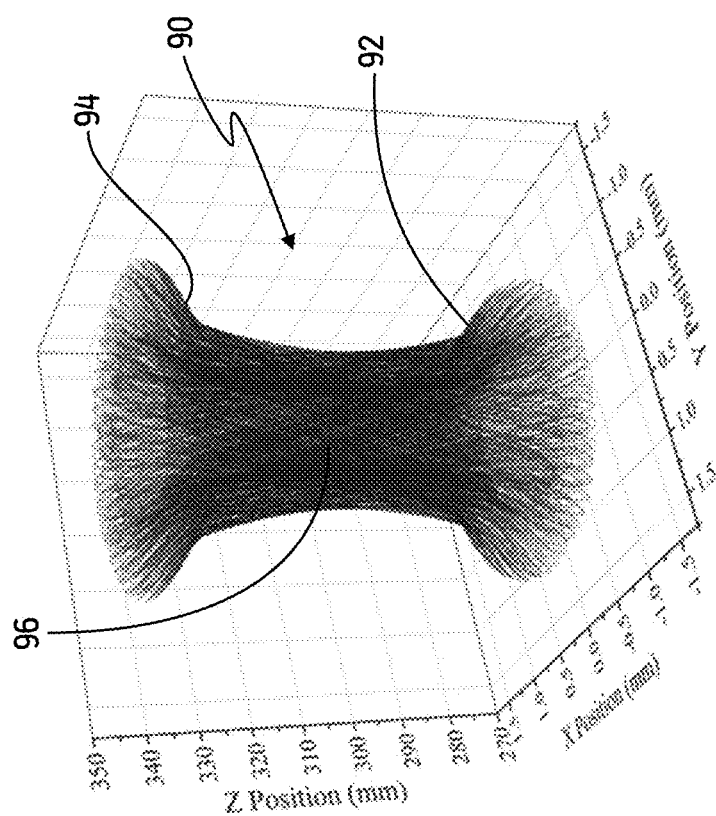
FIG. 7 is a plot of an example cylindrical ion oscillation trajectory within the ELIT of FIGS. 1-2B and 5A relative to the 3-dimensional coordinate system illustrated in FIGS. 5A-5C.
Figure 6:
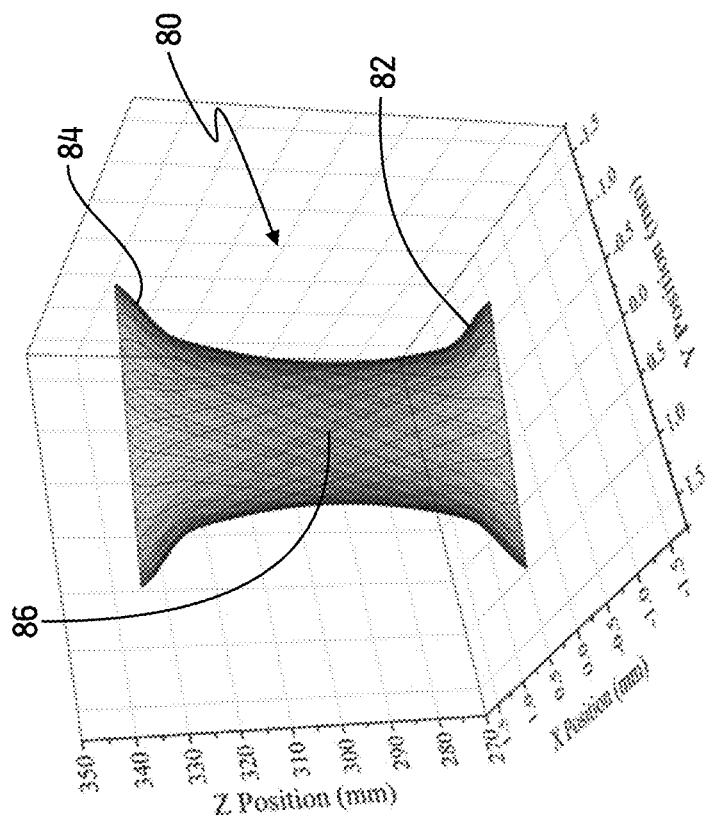
FIG. 6 is a plot of an example planar ion oscillation trajectory within the ELIT of FIGS. 1-2B and 5A relative to the 3-dimensional coordinate system illustrated in FIGS. 5A-5C.

Referring now to FIGS. 5A and 6-7, different ion oscillation trajectories within the ELIT 14 of FIGS. 1-2B and 4A-4C are considered in which Coulombic repulsion between multiple trapped ions is minimized. Referring specifically to FIG. 5A, a perspective cross-sectional view is shown of the ELIT 14 of FIGS. 1-2B and 4A-40 with a three-dimensional Cartesian coordinate system superimposed thereon. In the illustrated example, the z-axis extends centrally through the charge detection cylinder CD and the regions R1 and R2 of the ion mirrors M1 and M2 respectively, and is thus collinear with the central longitudinal axis 22 of the ELIT 14 as illustrated in FIGS. 1 and 2A-2B. For purposes of this description, the regions R1, R2 and the charge detection cylinder CD of the ELIT 14 are assumed to be cylindrically symmetric such that the x-axis of the coordinate system, running normal to the z-axis, defines a lateral or transverse plane bisecting the regions R1, R2 and the charge detection cylinder CD as illustrated by example in FIG. 5A. The y-axis of the coordinate system, likewise running normal to the z-axis, defines a medial, (or vertical or longitudinal) plane bisecting the regions R1, R2 and the charge detection cylinder CD. The zero intersection of the x, y and z axes is arbitrarily located at the ion inlet A1 of the ELIT 14 flush with the inner wall of the endcap 32 as best illustrated in FIG. 5B.

Two limiting forms of single ion oscillation trajectories within the ELIT 14 have been identified in which Coulombic repulsion between multiple trapped ions is minimized. One such single ion oscillation trajectory is illustrated by example in FIG. 6 in the form of a planar ion oscillation trajectory 80, and the other is illustrated by example in FIG. 7 in the form of a cylindrical ion oscillation trajectory 90.

The planar ion oscillation trajectory 80 illustratively represents a planar trajectory of ion travel back and forth through the regions R1, R2 and CD of the ELIT 14. In the example illustrated in FIG. 6, the planar ion oscillation trajectory 80 includes a planar frustum 82 with a flared base, an inverted but otherwise identical planar frustum 84 with a flared base and a generally rectangular plane 86 joining the frusta 82, 84. The opposed planar frusta 82, 84 illustratively represent the flared conical ion trajectories within the regions R1, R2 of the ion mirrors M1, M2 respectively, and the rectangular plane 86 illustratively represents the planar ion trajectory through the charge detection cylinder CD. An ion in the planar ion oscillation trajectory 80 illustrated in FIG. 6 thus oscillates back and forth through the ELIT 14 with a planar oscillation trajectory extending along the longitudinal (z) axis 22 such that its oscillation trajectory is largely constrained to a single line in the x-y plane as it moves along the z-axis 22. As also illustrated in FIG. 6, the planar ion oscillation trajectory 80 passes through the z-axis 22 at least once during each oscillation; once in the region R1 (although not necessarily through the longitudinal center of the charge detection cylinder CD) and once in the region R2.

The cylindrical ion oscillation trajectory 90 illustrated by example in FIG. 7 represents a generally cylindrical trajectory of ion travel back and forth through the regions R1, R2 and CD of the ELIT 14. In the illustrated example, the cylindrical ion oscillation trajectory 90 includes a frustum 92 with a flared base, an inverted but otherwise identical frustum 94 with a flared base and a central cylinder 96 joining the frusta 92, 94. As with the planar trajectory 80 illustrated in FIG. 6, the opposed frusta 92, 94 illustratively represent the flared conical ion trajectories within the regions R1, R2 of the ion mirrors M1, M2 respectively, and the central cylinder 96 illustratively represents the cylindrical ion trajectory through the charge detection cylinder CD. An ion in the cylindrical ion oscillation trajectory 90 illustrated in FIG. 7 illustratively undergoes an orbital motion in the x-y plane as it oscillates back and forth through the ELIT 14 along the z-axis 22 such that the cylindrical oscillation trajectory 90 extends along and about the z-axis 22. As a result of such orbital motion, the cylindrical ion oscillation trajectory 90 does not pass though the z-axis 22 in either region R1, R2 or in any other region of the ELIT 14 as also illustrated in FIG. 7.

It has been determined that the planar and cylindrical ion oscillation trajectories 80, 90 respectively illustrated in FIGS. 6 and 7 each depend in large part upon ion entrance conditions; specifically, upon ion entrance trajectories. As such, the trajectory of an ion entering the aperture A1 of the region R1 of the ELIT 14 can be controlled in a manner which favors a planar ion oscillation trajectory of the type illustrated in FIG. 6, or which favors a cylindrical ion oscillation trajectory of the type illustrated in FIG. 7. In particular, such control of ion entrance trajectory may take the form of one or a combination of controlling an amount or magnitude of radial offset of the entering ion relative to the z-axis 22 and controlling an angle of ion entrance relative to the z-axis 22. The "angle of ion entrance relative to the z-axis" may be alternatively referred to herein as an "angular divergence," and it will be understood that these two terms are to be considered interchangeable.

The radial offset of an ion entering the ELIT 14 is generally the distance between the z-axis 22 and a line parallel with the z-axis 22. Referring to FIG. 5B for example, the dashed line oz is parallel to but offset from the z-axis 22, and oz thus represents one example radial offset condition. As illustrated in FIG. 5B, the ion 70 traveling into the aperture A1 of the region R1 of the ELIT 14 along the radial offset line oz thus represents an ion entrance trajectory T1 having a radial offset only of "oz", i.e., having substantially no or negligible angular divergence (conversely, having an angular divergence of substantially 0°). The angular divergence of an ion entering the ELIT 14, on the other hand, is generally an angle relative to the z-axis 22 or relative to a radial offset, if any, at which an ion enters the ELIT 14. As also illustrated in FIG. 5B, the ion 72 traveling into the aperture A1 of the region R1 of the ELIT 14 at an angle DA1 relative to the z-axis 22 thus represents an ion entrance trajectory T1 having a divergence angle only of DA1, i.e., having substantially no or negligible radial offset relative to the z-axis 22. Finally, the ion 74 depicted in FIG. 5B as traveling into the aperture A1 of the region R1 of the ELIT 14 at an angle DA2 relative to the radial offset oz represents an ion entrance trajectory T3 having both a radial offset relative to the z-axis 22 of "oz" and a divergence angle of DA2 relative to the radial offset oz. It should be noted that in cases in which the ion entering the ELIT 14 has a radial offset and an angular divergence, the two may, but need not, be along the same direction in the x-y plane.

The ion entrance trajectory, e.g., in terms of a radial offset and/or an angular divergence, determines whether an ion entering the ELIT 14 follows a planar or a cylindrical ion oscillation trajectory within the ELIT 14. For example, an ion entering the aperture A1 of the ion mirror M1 at the z-axis 22 with or without a divergence angle will adopt a planar ion oscillation trajectory of the type illustrated in FIG. 6. An ion entering the aperture A1 of the ion mirror M1 with a radial offset relative to the z-axis 22 but with no (or negligible) divergence angle, e.g., a collimated entrance trajectory, will likewise adopt a planar ion oscillation trajectory. On the other hand, an ion entering the aperture A1 of the ion mirror M1 with both a radial offset relative to the z-axis 22 and a divergence angle pointing in any direction other than the offset axis will adopt a cylindrical ion oscillation trajectory.

Because the ELIT 14 is assumed to be cylindrically symmetric as described above, the three-dimensional ion reflection electric field (REF) that is induced within the regions R1, R2 during the ion reflection mode of operation of the ion mirrors M1, M2 can be described with respect to a two-dimensional radial slice at an arbitrary location through the ion mirror M1 of the ELIT 14 along the x-y plane as illustrated by example in FIG. 5C. Referring to FIG. 5C, an ion 78 within the region R1 of the ion mirror M1 is shown radially offset from the z-axis by a radial distance r. Within the region R1 (and also within the region R2 of the ion mirror M2), the ion reflection electric field REF operates to reflect the ion 78 entering R1 from the charge detection cylinder CD back toward and into the charge detection cylinder CD as described above with respect to FIG. 2B. In addition to reflecting the ion 78 back toward the charge detection cylinder CD, the ion reflection electric field REF also forces the ion toward the z-axis. This force is illustratively represented in the x-y plane of FIG. 5C by the vector F, and the direction of the vector F, as just described, always points toward the z-axis.

The velocity of the ion 78 positioned within the region R1 of the ion mirror M1 is represented in the x-y plane of FIG. 5C by the vector v. The ion velocity vector v forms an angle $\alpha_v$ with the x-y coordinate system, and the electric field force vector F likewise forms an angle $\alpha_F$ with the x-y coordinate system. The difference between the force vector angle $\alpha_F$ and the velocity vector angle $\alpha_v$ is the angle $\beta$ illustrated in FIG. 5C, wherein $\beta$ represents the deviation of the ion 78 from collinearity of the two vectors F and v. When the velocity vector v is aligned with the force vector F such that the angle $\beta$ is 0° or 180°, the ion 78 will assume a planar ion oscillation trajectory of the type illustrated in FIG. 6. When, on the other hand, the angle β between the force and velocity vectors v and F respectively is significantly greater or less than 0° or 180°, the ion 78 will assume a cylindrical ion oscillation trajectory of the type illustrated in FIG. 7. If either the angular divergence or the radial offset of an entering ion is zero or sufficiently small when the radial offset and the angular divergence of the entering ion are in the same direction in the x-y plane, then velocity vector v will point toward the z-axis and the ion oscillation trajectory will be planar. However, if the angular divergence and the radial offset are at different angles in the x-y plane, the ion oscillation trajectory will be cylindrical.

Figure 8:
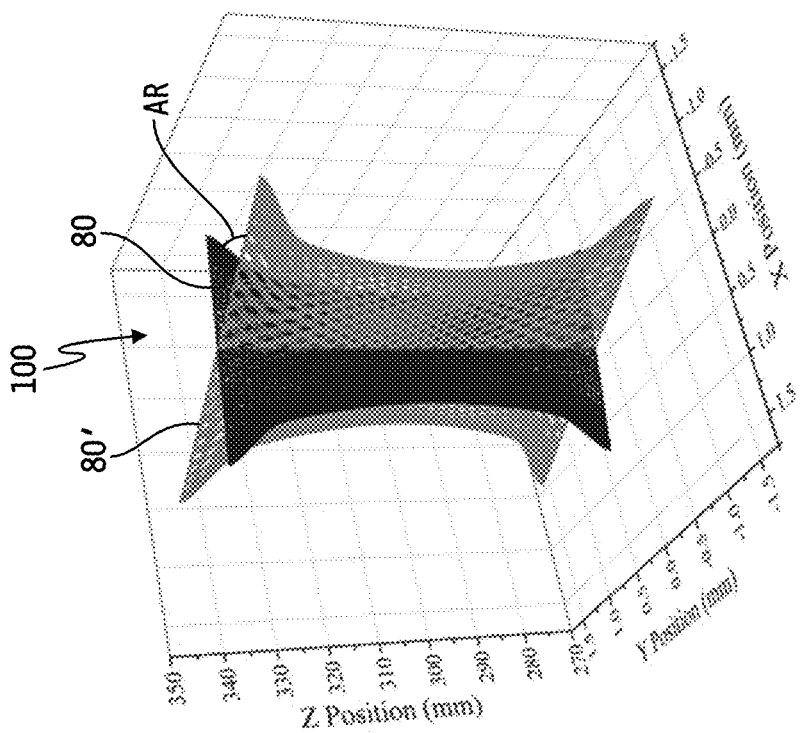
FIG. 8 is a plot similar to FIG. 6 depicting example orthogonal planar oscillation trajectories of two ions simultaneously trapped within the ELIT of FIGS. 1-2B and 5A relative to the 3-dimensional coordinate system illustrated in FIGS. 5A-5C.

By suitably controlling the entrance trajectories of multiple ions entering the ELIT 14, it is possible to favor a distribution of planar ion oscillation trajectories in which the likelihood of interactions, and thus Coulombic repulsion, between the multiple trapped ions simultaneously oscillating back and forth through the ELIT 14 is acceptably low. Referring to FIG. 8, for example, a plot is shown which represents a planar distribution of multiple ions 100 simultaneously trapped and oscillating back and forth within the ELIT 14. In the illustrated example, the planar distribution of ions 100 includes two planar ion oscillation trajectories 80, 80' defining an angle $A_R$ therebetween in the x-y plane. Each planar ion oscillation trajectory 80, 80' represents a single ion trapped and oscillating within the ELIT 14. In the example illustrated in FIG. 8, the ELIT 14 thus has two ions trapped and oscillating back and forth therein, with each ion following one of two different planar ion oscillation trajectories 80, 80' each with a unique $\alpha_F$ wherein the difference between $\alpha_F$ of one ion and $\alpha_F$ for the other ion is the angle $A_R$. In the illustrated example, $A_R$ is approximately 90° such that the two planes 80, 80' are orthogonal, although it will be understood that $A_R$ may alternatively be greater or less than 90°. As also illustrated in FIG. 8, the two ions can potentially interact with one another only along the z-axis where the two planes 80, 80' intersect with one another, and in some embodiments the likelihood of interaction between the two ions may therefore be acceptably low. It will be understood that the planar ion distribution of two ions illustrated in FIG. 8 is provided only by way of example, and that in other implementations the ion entrance trajectories may be controlled to trap two or more ions each having a different planar ion oscillation trajectory that is offset from adjacent planar ion oscillation trajectories by angle $A_R$ of less than 90°. Two or more ions having different planar ion oscillation trajectories will thus be angularly offset from one another about the z-axis 22 by their respective planar angles $A_R$.

Given the ion entrance conditions discussed above with respect to FIGS. 5B and 5C, ion entrance trajectories which favor a planar distribution of ions within the ELIT 14 can illustratively be controlled in several different ways. Examples include, but are not limited to, injecting a collimated beam of ions with a large radial distribution of ions into the aperture A1 of the ion mirror M1 while keeping voltages D1-D4 of power supply V1 grounded and the central, longitudinal axis of the beam centered on the z-axis 22 so as to produce a distribution of radial offsets centered at the z-axis 22, and injecting a collimated beam of ions into the aperture A1 of the ion mirror M1 and then varying the focusing power of the ion transmission electric field of the ion region R1 in the ion mirror M1 by manipulating voltages D1-D4 of V1 to impart an angular convergence on the ion beam towards a focal point that lies on the z-axis 22. Any such control of the ion entrance trajectories will allow for the trapping of two or more ions within the ELIT 14 which will favor two or more corresponding planar ion oscillation trajectories within the ELIT 14 each forming an angle $A_R$ in the x-y plane relative to adjacent trajectories which extends along the z-axis 22. Various single or multiple stage instruments may be implemented as part of the ion source 12 illustrated in FIG. 1, or disposed between the ion source 12 and the ELIT 14, for suitably controlling ion entrance trajectories in a manner which favors a planar distribution of ions oscillating back and forth within the ELIT 14. An example embodiment of one such instrument is illustrated in FIG. 11 and will be described in detail below.

Figure 9:
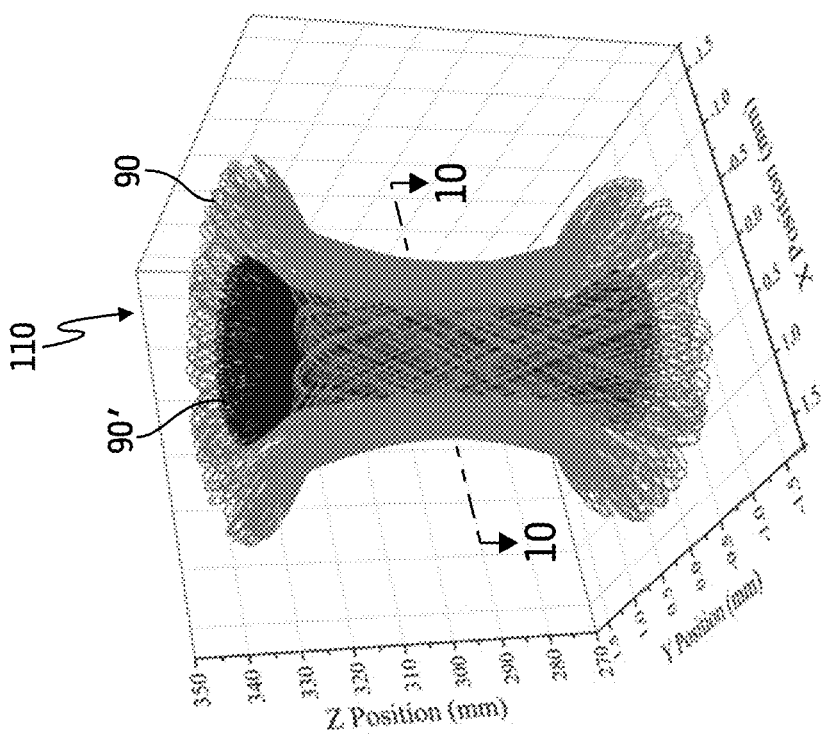
FIG. 9 is a plot similar to FIG. 7 depicting example nested cylindrical oscillation trajectories of two ions simultaneously trapped within the ELIT of FIGS. 1-2B and 5A relative to the 3-dimensional coordinate system illustrated in FIG. 5A-5C.

By suitably controlling the entrance trajectories of multiple ions entering the ELIT 14, it is also possible to favor a distribution of cylindrical ion oscillation trajectories in which the likelihood of close interactions, and thus Coulombic repulsion, between the multiple trapped ions simultaneously oscillating back and forth through the ELIT 14 is minimized. Examples include, but are not limited to, focusing a collimated beam of ions into a point along the z-axis 22 and sweeping the point along a line of radial offsets relative to the z-axis 22, focusing a collimated beam of ions into a plane at the aperture A1 of the ion mirror M1 and offsetting from the z-axis 22, and injecting an uncollimated beam of ions into the ELIT 14. Referring to FIG. 9, for example, a plot is shown which represents a cylindrical distribution of multiple ions 110 simultaneously trapped and oscillating back and forth within the ELIT 14. In the illustrated example, the cylindrical distribution of ions 110 includes two cylindrical ion oscillation trajectories 90, 90' with the cylindrical ion oscillation trajectory 90' completely nested within the cylindrical ion oscillation trajectory 90. Each cylindrical ion oscillation trajectory 90, 90' represents a single ion trapped and oscillating within the ELIT 14. In the example illustrated in FIG. 9, the ELIT 14 thus has two ions trapped and oscillating back and forth therein, with each ion following one of two different cylindrical ion oscillation trajectories 90, 90' and with one trajectory 90' completely nested within the other trajectory 90. With this configuration, the ion following the trajectory 90 thus has no opportunity to significantly interact with the ion following the trajectory 90' and vice versa. It will be understood that the cylindrical ion distribution of two ions illustrated in FIG. 9 is provided only by way of example, and that in other implementations the ion entrance trajectories may be controlled to trap three or more ions with successively nested cylindrical ion oscillation trajectories.

Figures 10, 11:
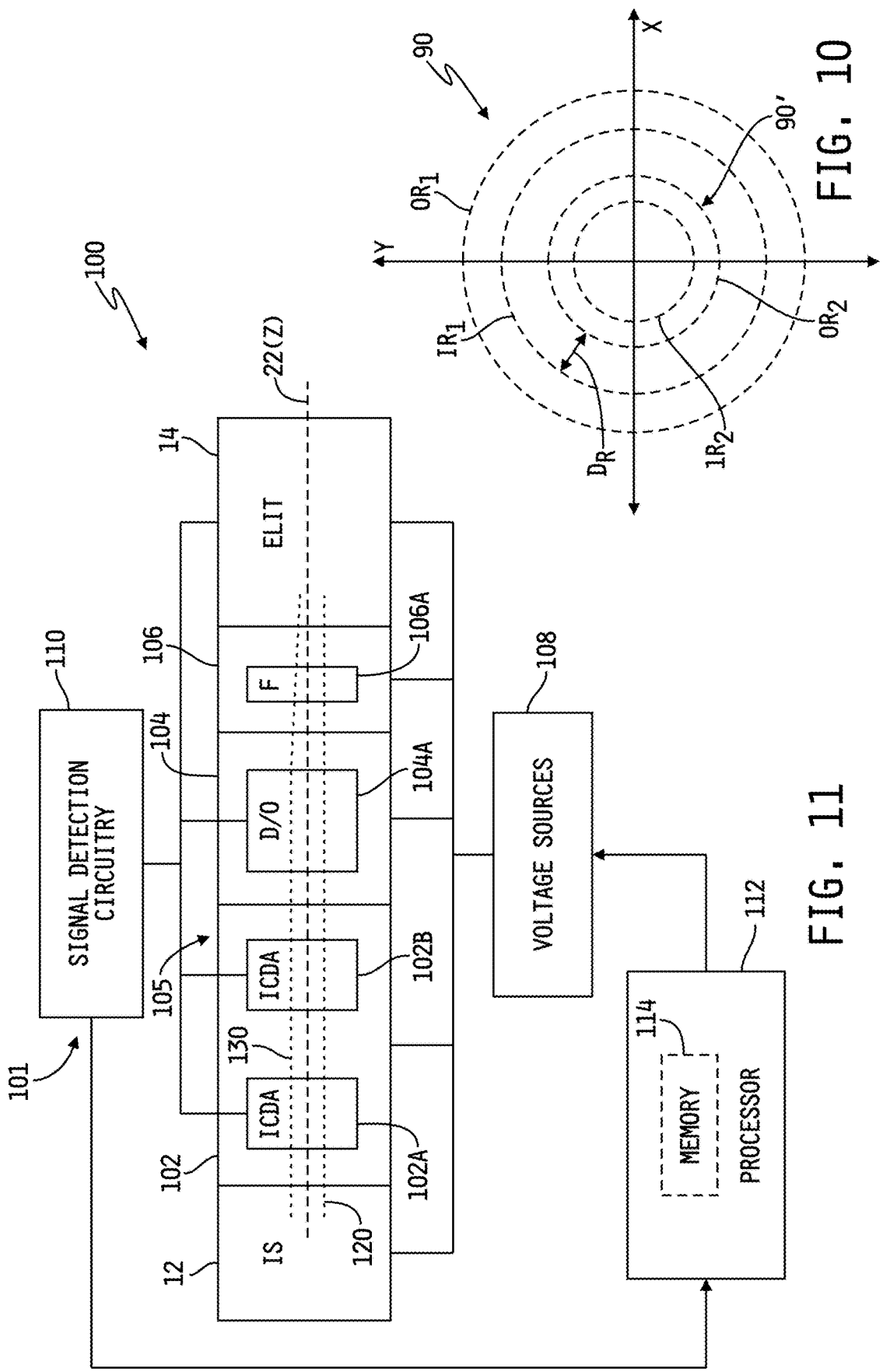
FIG. 10 is a cross-sectional view of the two nested cylindrical oscillation trajectories plot of FIG. 9 as viewed along section lines 10-10.
FIG. 11 is a simplified diagram of an embodiment of a charge detection mass spectrometer including a trajectory control apparatus for selectively controlling the trajectories of ions entering the ELIT to achieve simultaneous trapping of multiple ions with a distribution of planar or cylindrical oscillation trajectories.

Referring now to FIG. 10, the outer cylindrical ion oscillation trajectory 90 is illustrated as having an inner radius $IR_1$ and an outer radius $OR_1$ along the section line 10-10 of FIG. 9, wherein the radial distance between $IR_1$ and $OR_1$ defines the thickness of the cylindrical trajectory 90. The inner cylindrical ion oscillation trajectory 90' similarly has an inner radius $IR_2$ and an outer radius $OR_2$ along the section line 10-10 of FIG. 9, wherein the radial distance between $IR_2$ and $OR_2$ defines the thickness of the cylindrical trajectory 90'. The radial distance between the inner radius $IR_1$ of the outer cylindrical ion oscillation trajectory 90 and the outer radius $OR_2$ of the inner cylindrical ion oscillation trajectory 90' is DR.

The inner and outer radii of a cylindrical ion oscillation trajectory can be controlled by controlling the magnitude of the radial offset of the ion entrance trajectory relative to the z-axis 22. Thus, if multiple ions enter the ELIT 14 via the aperture A1 of the ion mirror M1 with a radial distribution, the resulting multiple cylindrical ion oscillation trajectories within the ELIT 14 will each have different, independent radii, which will contribute to minimizing the likelihood of close interactions between the multiple trapped ions. The thickness of a cylindrical ion oscillation trajectory in relation to the average radius of the trajectory can similarly be controlled by controlling the magnitude of the angular divergence of the ion entrance trajectory relative to the radial offset line parallel with the z-axis 22. For example, the thinnest cylindrical ion oscillation trajectories are produced when β approaches 90°. Thin cylindrical ion oscillation trajectories are preferable in embodiments in which it is desirable to nest or stack many cylindrical ion oscillation trajectories within the ELIT 14. As compared with planar ion oscillation trajectories, the ELIT 14 can accommodate substantially more ions simultaneously oscillating back and forth therein with nested cylindrical ion oscillation trajectories because each such nested cylindrical ion oscillation trajectory occupies a unique region within the ELIT 14, i.e., a region that is separate and distinct from those occupied by all other cylindrical ion oscillation trajectories.

Given the ion entrance conditions discussed above with respect to FIGS. 5B and 5C, ion entrance trajectories which favor a cylindrical distribution of ions within the ELIT 14 can illustratively be controlled in several different ways. Examples include, but are not limited to, one or more of the example techniques described above with respect to the planar distribution of ions but doing so with an uncollimated beam of ions such that the ions not only have a distribution of radial offsets but also a distribution of divergence angles. In any case, as the radial offset of an entering ion increases in radial distance from the z-axis 22 of the ELIT 14, so too does the magnitude of the force vector F (see FIG. 5C) pointing toward the z-axis 22. For a particular velocity vector v, the inner radius of a cylindrical ion oscillation trajectory resulting from an ion entering the ELIT 14 with a relatively greater radial offset is thus less than that of a cylindrical ion oscillation trajectory resulting from an ion entering the ELIT 14 with a relatively lower radial offset because the magnitude of the force vector F acting on the former is less than that acting on the latter.

Moreover, as the radial offset of an entering ion increases, the angle of divergence, represented by the magnitude of the velocity vector v that points away from the force vector F, of the entering ion must also increase in order to cause the entering ion to adopt a cylindrical ion oscillation trajectory. This is so because if the velocity vector v is pointing along the same plane as the force vector F, i.e., where β is 0 or 180 degrees, the ion motion will be influenced only by the force vector, thereby causing the entering ion to adopt an oscillation trajectory that lies in the same plane as the force vector F as described above with respect to FIG. 5C. Any ion velocity vector v component that is not coplanar with the force vector F, i.e., where β is anything larger or smaller than 0 or 180, causes the ion to rotate in the x-y plane while oscillating back and forth along the z-axis 22 because no force acts on the ion in the direction of its rotation. The magnitude of the force vector F towards the z-axis 22 experienced by an ion trapped in the ELIT 14 is directly proportional to the radial offset of the ion. Since the force vector F acting on an ion increases with the radial offset, an ion oscillating farther away from the z-axis 22 is subjected to a larger force vector F towards the z-axis 22 which causes its oscillation trajectory to become dominated by the force vector F and becomes more planar. To compensate for this effect and induce the formation of cylindrical ion oscillation trajectories at all radial offsets in the ELIT 14, as the magnitude of the force vector F increases, so too must the magnitude of the velocity vector v in a direction that is perpendicular to the force vector F by a commensurate amount which ensures that the entering ion will adopt a cylindrical oscillation trajectory. Various single or multiple stage instruments may be implemented as part of the ion source 12 illustrated in FIG. 1, or disposed between the ion source 12 and the ELIT 14, for suitably controlling ion entrance trajectories in a manner which favors a cylindrical distribution of ions oscillating back and forth within the ELIT 14. An example embodiment of one such instrument is illustrated in FIG. 11 and will be described in detail below.

Based on the foregoing, the nested cylindrical ion oscillation trajectories illustrated by example in FIG. 9 are superior to the angularly distributed planar ion oscillation trajectories illustrated by example in FIG. 8 in terms minimizing interactions between multiple ions trapped within the ELIT 14. However, while the angularly distributed planar ion oscillation trajectories do not completely eliminate the potential for ion interaction within the ELIT 14, the probability of such ion interaction is substantially reduced as compared with conventional ion entrance control techniques. Moreover, based on the design of the ELIT 14 illustrated in FIGS. 1-2B and described above, the oscillation frequency stability of nested cylindrical ion oscillation trajectories is superior to that of the angularly distributed planar ion oscillation trajectories. In other words, fluctuations in ion oscillation frequency during a trapping event within the ELIT 14 are greater for planar ion oscillation trajectories than for cylindrical ion oscillation trajectories. Since the oscillation frequency within the ELIT 14 is used to determine ion mass-to-charge ratio (m/z), m/z determination uncertainty is therefore expected to be smaller for cylindrical ion oscillation trajectories than for planar ion oscillation trajectories. This may not be the case for other ELIT designs, and indeed it is to be understood that the concepts illustrated in the attached figures and described herein may be implemented with ELIT designs and configurations different in one or more aspects from the ELIT 14 illustrated in FIGS. 1-2B and described herein. Moreover, it is possible that the design of the ELIT 14 may be modified and/or that an ELIT or other ion trap may be designed, in a manner which reduces such fluctuations in oscillation frequency.

It is also possible to split the charge detection cylinder CD of the ELIT 14 into two halves along the longitudinal axis and either connect a separate detection circuit as shown in FIG. 3 to each charge detection cylinder half and independently analyze the signal coming from each half, or perform a differential measurement between the two charge detection cylinder halves using a differential amplifier. In the former case where a separate circuit is used for each half, the digitized signal for each half may be analyzed by fast Fourier transform and the magnitude of the fundamental frequency peak related to the average proximity of an ion to each charge detection cylinder half over the course of a trapping event. In other words, a cylindrical ion oscillation trajectory with an outer radius such as OR1 of 90 in FIG. 10 will oscillate at a particular average distance from the two charge detection cylinder halves. The magnitude of the fundamental frequency peak in the Fourier transform depends on how close the ion was to the charge detection cylinder halves. From this, the outer radius of the cylindrical ion oscillation trajectory can be deduced and used to correct the measured ion m/z to account for deviations from the actual ion m/z that result from ion oscillation trajectory distributions. In the latter case, a differential amplifier can be used to monitor the difference in signal between the two charge detection cylinder halves. Ion oscillation frequencies that are very close to the z-axis 22, i.e., its outer radius is small, would produce a small difference in signal between the halves because the ion is a similar distance from each half. However, an ion oscillation trajectory that has a large outer radius is much closer to one charge detection cylinder half than the other which will result in a large difference in signal between the two halves. A fast Fourier transform can be employed to measure the fundamental frequency magnitude from the digitized differential amplifier signal and related to the ion oscillation trajectory outer radius, lending this as a method of ascertaining the three-dimensional ion oscillation trajectory to correct for deviations in the measured m/z of an ion that arise from trajectory distributions. Alternatively, the charge detection cylinder CD can be left whole and additional charge detection cylinders can be located in any other region of the trap where the oscillating ion would produce an induced image charge on the additional cylinders that is representative of the ion oscillation trajectory.

As described above, it is possible to tune the ion entrance trajectories, i.e., the trajectories of ions entering the ELIT 14, in a manner which favors a distribution of planar or cylindrical ion oscillation trajectories within the ELIT 14, and some example techniques for controlling ion entrance trajectories to favor each trajectory are briefly described above. Such examples of controlling ion entrance trajectories to favor a distribution of planar ion oscillation trajectories illustratively include, but are not limited to, injecting a collimated beam of ions with a large radial distribution of ions into the aperture A1 of the ion mirror M1 while keeping the voltages D1-D4 of power supply V1 grounded and the central, longitudinal axis of the beam centered on the z-axis 22 so as to produce a distribution of radial offsets centered at the z-axis 22, and injecting a collimated beam of ions into the aperture A1 of the ion mirror M1 and then varying the focusing power of the ion transmission electric field of the ion region R1 in the ion mirror M1 by manipulating voltages D1-D4 of V1 to impart an angular convergence on the ion beam towards a focal point that lies on the z-axis 22. Alternatively, focusing a collimated beam of ions into a point along the z-axis 22 and sweeping the point along a line of radial offsets relative to the z-axis 22, focusing a collimated beam of ions into a plane at the aperture A1 of the ion mirror M1 and offsetting the plane from the z-axis 22, and injecting an uncollimated, i.e., convergent or divergent, beam of ions that includes not only a distribution of radial offsets but also a distribution of angular divergence into the aperture A1 of the ion mirror M1 are example techniques for controlling ion entrance trajectories to favor a distribution of cylindrical ion oscillation trajectories. Any such control of the ion entrance trajectories will allow for the trapping of two or more ions within the ELIT 14 which will favor a distribution of planar or cylindrical ion oscillation trajectories respectively. In this regard, an embodiment is shown in FIG. 11 of a charge detection mass spectrometer (CDMS) 100 which includes the ion source 12 illustrated in FIG. 1 and described above, which includes the ELIT 14 illustrated in FIGS. 1-2B and described above and which includes an example embodiment of an ion trajectory control apparatus 101 for selectively controlling the trajectories of ions exiting the ion source 12 and entering the ELIT 14 in a manner which achieves simultaneous trapping of multiple ions in and by the ELIT 14 and which favors a distribution within the ELIT 14 of planar or cylindrical ion oscillation trajectories.

Referring now to FIG. 11, the ion trajectory control apparatus 101 illustratively includes a multi-stage ion trajectory control instrument 105 disposed between the ion source 12 and the ELIT 14 and operatively coupled to one or more voltage sources 108 and to signal detection circuitry 110. The one or more voltage sources 108 may illustratively include any number of conventional voltage sources configured to produce one or more constant or switching DC voltages of selectable polarity and/or magnitude, and any number of conventional voltage sources configured to produce one or more time-varying, i.e., AC, voltages of selectable frequency and/or peak magnitude. One or any combination of the one or more voltage sources 108 may be manually controllable and/or may be operatively coupled to a conventional processor 112 for processor control thereof. One or more of the voltage sources 108 may also be used to control one or more operational features of the ion source 12, and in some embodiments the one or more voltage sources 108 may include the voltage sources V1 and V2 illustrated in FIG. 1 and operable to control operation of the ELIT 14 as described above.

The signal detection circuitry 110 illustratively includes one or more conventional signal sensors and conventional signal detection circuitry for detecting one or more operating conditions of the ion trajectory control instrument 105. In some embodiments, the signal detection circuitry 110 may include the charge preamplifier CP operatively coupled to the ELIT 14 as illustrated in FIG. 1 and described above. In any case, the signal detection circuitry 110 is operatively coupled to the processor 112, and signals detected by the circuitry 110 are thus provided to the processor 112 for processing thereof.

The processor 112 illustratively includes, or is operatively coupled to, at least one conventional memory unit 114 for storing operating instructions for the processor 114 and to store data collected and/or processed by the processor 112. As it relates to the operation and control of the ion trajectory control instrument 105, the memory unit(s) 114 illustratively has one or more sets of instructions stored therein which, when executed by the processor 112, cause the processor 112 to control one or more of the voltage sources 108 based, at least in part, on one or more signals produced by the signal detection circuitry 110, in a manner which selectively controls the trajectories of ions exiting the ion source 12 and entering the ELIT 14 so as to achieve simultaneous trapping of multiple ions in and by the ELIT 14 and which causes the ions entering the ELIT 14 to adopt a distribution therein of planar or cylindrical ion oscillation trajectories. The processor 112 may include one or more conventional computing devices in the form of any one or combination of one or more conventional microprocessors and/or controllers, one or more field programmable gate arrays (FPGAs), one or more application specific integrated circuits (ASICs), one or more conventional personal, lap top, desk top, tablet or other computers, or the like.

In the illustrated embodiment, the ion trajectory control instrument 105 includes a number of cascaded ion trajectory control stages. It will be understood that such stages are illustrated only by way of example, and that alternate embodiments of the instrument 105 may include more or fewer ion trajectory control stages. In any case, the instrument 105 depicted in FIG. 11 illustratively includes an image charge detection array stage 102 having an ion inlet at one end configured to receive ions generated by the ion source 12 and an ion outlet at an opposite end that is operatively coupled to an ion inlet of an ion deflector/offset stage 104 having an ion outlet operatively coupled to an ion inlet of an ion focusing stage 106. An ion outlet of the ion focusing stage 106 is operatively coupled to the ion inlet aperture A1 of the ion mirror M1 of the ELIT 14 such that ions exiting the ion focusing stage 106 enter the ELIT 14 via the aperture A1 of the ion mirror M1.

The image charge detection array stage 102 illustratively includes at least two spaced-apart arrays 102A, 102B of conventional image charge detectors. As ions exit the ion source 12 in the form of a beam and pass sequentially through the image charge detector arrays 102A, 102B, conventional image charge detection circuitry included as part of the signal detection circuitry 110 provides respective image charge detection signals to the processor 112 from which the processor 112 is operable to determine the positions of the ions passing sequentially through each array 102A, 102B. From this information, the trajectory of the ion beam exiting the stage 102 can be determined. It will be understood that although the image charge detection array stage 102 is illustrated in FIG. 11 and described herein as including only two spaced-apart image charge detector arrays, alternate embodiments of the stage 102 may include more or fewer spaced-apart image charge detector arrays.

The ion deflector/offset stage 104 illustratively includes one or more conventional ion deflectors and/or one or more conventional ion offset apparatuses. Based on the computed trajectory of the ion beam exiting the stage 102, the processor 112 is illustratively operable to compute, e.g., in real-time, adjustments to the ion beam trajectory required to achieve an ion entrance trajectory which will favor a selected planar or cylindrical distribution of ion oscillation trajectories within the ELIT 14 as described in detail hereinabove. Such computed adjustments are illustratively fed to the one or more ion deflectors and/or one or more ion offset apparatuses in the stage 104 in the form of control signals, and the one or more ion deflectors and/or one or more ion offset apparatuses are responsive to such control signals to selectively alter the trajectory of the ion beam passing therethrough, e.g., by controlling either or both of a radial offset of the ion beam relative to the z-axis 22 and an angle of the ion beam relative to the z-axis 22 and/or relative to an axis that passes through the ELIT 14 and that is parallel with the z-axis 22.

The ion focusing stage 106 illustratively includes one or more conventional ion focusing elements. The adjusted ion beam trajectory exiting the ion deflector/offset stage 104 is suitably focused as it passes through the one or more ion focusing elements, and the ion beam emerging from the ion focusing stage 106 is passed into the ELIT 14 via the ion inlet aperture A1 of the ion mirror M1 as described above.

As illustrated by dashed-line representation in FIG. 11, one example ion entrance trajectory produced by the ion trajectory control instrument 105 may be a collimated ion beam 120 which is radially offset from the z-axis 22 of the ELIT 14 and which is suitably manipulated using any of the techniques described above so as to favor a distribution of planar ion oscillation trajectories within the ELIT 14. As also illustrated by dashed-line representation in FIG. 11, another example ion entrance trajectory produced by the ion trajectory control instrument 105 may be an uncollimated ion beam 130 which is radially offset from the z-axis 22 of the ELIT 14 and includes a distribution of divergence angles, and which is suitably manipulated using any of the techniques described above so as to favor a distribution of cylindrical ion oscillation trajectories within the ELIT 14.

In some alternate embodiments, the ion trajectory control instrument 105 may be or include at least one conventional ion trap that is controlled by the processor 112 in a conventional manner to collect ions therein, to focus the collected ion toward the z-axis 22 passing through the ion trap, and to then selectively release the collected ions. Upon release, the exiting ions will expand radially about the z-axis 22 and may thereafter be focused by one or more focusing elements into the ELIT 14. In this embodiment, the ion beam exiting the ion trap will include an angular distribution of ions distributed radially about the z-axis 22, and such an ion entrance trajectory will thus favor a distribution of cylindrical ion oscillation trajectories.

In addition to or in place of the ion trajectory control instrument 105, one or more magnetic and electric field generators may suitably positioned relative to the ELIT 14 and selectively controlled in a manner which controls or guides the ion oscillation trajectories within the ELIT 14. If, for example, the generated magnetic field lines extend along the z-axis 22, ions trapped within the ELIT 14 will undergo a cyclotron motion as they oscillate back and forth through the ELIT 14. Also, a collimated ion beam can be injected into a magnetic lens positioned between the ion source 12 and ELIT 14 aligned with the ELIT 14 z-axis 22. The lens would impart a radial Lorentz force on the ions as they travel through the lens that can give them a radial velocity with a magnitude that is proportional to the ion distance from the z-axis 22 and in a direction that may give rise to cylindrical ion oscillation trajectories. The magnetic field strength of the lens can be adjusted by varying the electric current in the lens coil so as to cause ions to enter the ELIT 14 with trajectories that favor the formation of planar or cylindrical ion oscillation trajectories. Such control may induce or enhance a desired ion oscillation trajectory or distribution of ion oscillation trajectories within the ELIT 14.

Those skilled in the art will recognize other conventional instruments and combinations of conventional instruments that may be used to guide and control ion inlet trajectories according to ion inlet conditions described herein which result in planar or cylindrical distributions of ion oscillation trajectories with an electrostatic linear ion trap such as the ELIT 14 illustrated in the attached figures and described herein. It will be understood that any such other conventional instruments and combinations thereof are contemplated by, and are intended to fall within the scope of, this disclosure.

In any case, with multiple ions oscillating back and forth through the ELIT 14 with either a planar or cylindrical distribution of ion oscillation trajectories, charges induced on the charge detection cylinder CD of the ELIT 14 by the multiple ions passing therethrough are detected by the charge preamplifier CP, and corresponding charge detection signals CHD are passed to the processor 16 for the duration of a trapping event as described above with respect to FIGS. 1-4C. When the stored collection of charge detection signals for a trapping event are processed using a conventional Fourier transform algorithm as described above, multiple fundamental frequency peaks will emerge, each corresponding to a respective one of the multiple trapped ions. The harmonic peaks associated with each such fundamental peak may then be easily identified, and ion charge, mass-to-charge and mass may then be determined as described above for each of the multiple trapped ions.

Referring now to FIG. 12A, a simplified block diagram is shown of an embodiment of an ion separation instrument 200 which may include the ELIT 14 illustrated and described herein, and which may include the charge detection mass spectrometer 100 illustrated and described herein, and which may include any number of ion processing instruments which may form part of the ion source 12 upstream of the ELIT 14 and/or which may include any number of ion processing instruments which may be disposed downstream of the ELIT 14 to further process ion(s)

exiting the ELIT 14. In this regard, the ion source 12 is illustrated in FIG. 12A as including a number, Q, of ion source stages $IS_1$-$IS_Q$ which may be or form part of the ion source 12, where Q may be any positive integer. Alternatively or additionally, an ion processing instrument 202 is illustrated in FIG. 12A as being coupled to the ion outlet of the ELIT 14, wherein the ion processing instrument 210 may include any number, R, of ion processing stages $OS_1$-$OS_R$, where R may be any positive integer.

Turning now to the ion source 12, it will be understood that the source 12 of ions entering the ELIT may be or include, in the form of one or more of the ion source stages $IS_1$-$IS_Q$, one or more conventional sources of ions as described above, and may further include one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing or shifting ion charge states, and the like. It will be understood that the ion source 12 may include one or any combination, in any order, of any such conventional ion sources, ion separation instruments and/or ion processing instruments, and that some embodiments may include multiple adjacent or spaced-apart ones of any such conventional ion sources, ion separation instruments and/or ion processing instruments.

Turning now to the ion processing instrument 202, it will be understood that the instrument 202 may be or include, in the form of one or more of the ion processing stages $OS_1$-$OS_R$, one or more conventional instruments for separating ions according to one or more molecular characteristics (e.g., according to ion mass, ion mass-to-charge, ion mobility, ion retention time, or the like), one or more conventional instruments for collecting and/or storing ions (e.g., one or more quadrupole, hexapole and/or other ion traps), one or more conventional instruments for filtering ions (e.g., according to one or more molecular characteristics such as ion mass, ion mass-to-charge, ion mobility, ion retention time and the like), one or more conventional instruments for fragmenting or otherwise dissociating ions, one or more conventional instruments for normalizing or shifting ion charge states, and the like. It will be understood that the ion processing instrument 202 may include one or any combination, in any order, of any such conventional ion separation instruments and/or ion processing instruments, and that some embodiments may include multiple adjacent or spaced-apart ones of any such conventional ion separation instruments and/or ion processing instruments. In any implementation which the ion source 12 and/or the ion processing instruments 202 includes one or more mass spectrometers, any one or more such mass spectrometers may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like.

As one specific implementation of the ion separation instrument 200 illustrated in FIG. 12A, which should not be considered to be limiting in any way, the ion source 12 illustratively includes 3 stages, and the ion processing instrument 202 is omitted. In this example implementation, the ion source stage $IS_1$ is a conventional source of ions, e.g., electrospray, MALDI or the like, the ion source stage $IS_2$ is a conventional ion filter, e.g., a quadrupole or hexapole ion guide, and the ion source stage $IS_3$ is a mass spectrometer of any of the types described above. In this embodiment, the ion source stage $IS_2$ is controlled in a conventional manner to preselect ions having desired molecular characteristics for analysis by the downstream mass spectrometer, and to pass only such preselected ions to the mass spectrometer, wherein the multiple ions simultaneously analyzed by the ELIT 14 will be the preselected ions separated by the mass spectrometer according to mass-to-charge ratio. The preselected ions exiting the ion filter may, for example, be ions having a specified ion mass or mass-to-charge ratio, ions having ion masses or ion mass-to-charge ratios above and/or below a specified ion mass or ion mass-to-charge ratio, ions having ion masses or ion mass-to-charge ratios within a specified range of ion mass or ion mass-to-charge ratio, or the like. In some alternate implementations of this example, the ion source stage $IS_2$ may be the mass spectrometer and the ion source stage $IS_3$ may be the ion filter, and the ion filter may be otherwise operable as just described to preselect ions exiting the mass spectrometer which have desired molecular characteristics for analysis by the downstream ELIT 14. In other alternate implementations of this example, the ion source stage $IS_2$ may be the ion filter, and the ion source stage $IS_3$ may include a mass spectrometer followed by another ion filter, wherein the ion filters each operate as just described.

As another specific implementation of the ion separation instrument 200 illustrated in FIG. 12A, which should not be considered to be limiting in any way, the ion source 12 illustratively includes 2 stages, and the ion processing instrument 202 is again omitted. In this example implementation, the ion source stage $IS_1$ is a conventional source of ions, e.g., electrospray, MALDI or the like, the ion source stage $IS_2$ is a conventional mass spectrometer of any of the types described above. In this implementation, the instrument 200 takes the form of the charge detection mass spectrometer (CDMS) 100 in which the ELIT 14 is operable to simultaneously analyze multiple ions exiting the mass spectrometer.

As yet another specific implementation of the ion separation instrument 200 illustrated in FIG. 12A, which should not be considered to be limiting in any way, the ion source 12 illustratively includes 2 stages, and the ion processing instrument 202 is omitted. In this example implementation, the ion source stage $IS_1$ is a conventional source of ions, e.g., electrospray, MALDI or the like, and the ion source stage $IS_2$ is a conventional single or multiple-stage ion mobility spectrometer. In this implementation, the ion mobility spectrometer is operable to separate ions, generated by the ion source stage $IS_1$, over time according to one or more functions of ion mobility, and the ELIT 14 is operable to simultaneously analyze multiple ions exiting the ion mobility spectrometer. In an alternate implementation of this example, the ion processing instrument 202 may include a conventional single or multiple-stage ion mobility spectrometer as a sole stage $OS_1$ (or as stage $OS_1$ of a multiple-stage instrument). In this alternate implementation, the ELIT 14 is operable to simultaneously analyze multiple ions generated by the ion source stage $IS_1$, and the ion mobility spectrometer $OS_1$ is operable to separate ions exiting the ELIT 14 over time according to one or more functions of ion mobility. As another alternate implementation of this example, single or multiple-stage ion mobility spectrometers may follow both the ion source stage $IS_1$ and the ELIT 14. In this alternate implementation, the ion mobility spectrometer following the ion source stage IS$_1$ is operable to separate ions, generated by the ion source stage IS$_1$, over time according to one or more functions of ion mobility, the ELIT 14 is operable to simultaneously analyze multiple ions exiting the ion source stage ion mobility spectrometer, and the ion mobility spectrometer of the ion processing stage OS$_1$ following the ELIT 14 is operable to separate ions exiting the ELIT 14 over time according to one or more functions of ion mobility. In any implementations of the embodiment described in this paragraph, additional variants may include a mass spectrometer operatively positioned upstream and/or downstream of the single or multiple-stage ion mobility spectrometer in the ion source 12 and/or in the ion processing instrument 202.

As still another specific implementation of the ion separation instrument 200 illustrated in FIG. 12A, which should not be considered to be limiting in any way, the ion source 12 illustratively includes 2 stages, and the ion processing instrument 202 is omitted. In this example implementation, the ion source stage IS$_1$ is a conventional liquid chromatograph, e.g., HPLC or the like configured to separate molecules in solution according to molecule retention time, and the ion source stage IS$_2$ is a conventional source of ions, e.g., electrospray or the like. In this implementation, the liquid chromatograph is operable to separate molecular components in solution, the ion source stage IS$_2$ is operable to generate ions from the solution flow exiting the liquid chromatograph, and the ELIT 14 is operable to simultaneously analyze multiple ions generated by the ion source stage IS$_2$. In an alternate implementation of this example, the ion source stage IS$_1$ may instead be a conventional size-exclusion chromatograph (SEC) operable to separate molecules in solution by size. In another alternate implementation, the ion source stage IS$_1$ may include a conventional liquid chromatograph followed by a conventional SEC or vice versa. In this implementation, ions are generated by the ion source stage IS$_2$ from a twice separated solution; once according to molecule retention time followed by a second according to molecule size, or vice versa. The ability to analyze trapping events containing multiple simultaneously trapped ions is highly valuable in experiments where the mass spectrometer is coupled to a chromatographic technique. When molecules are sufficiently separated in the chromatograph, they elute from the chromatograph in bursts, each on the order of seconds to minutes in duration, where each burst occurs only once for each molecule per sample injection into the chromatograph. The abundance of ions exiting the chromatograph as a function of the elution time can be considered the elution profile. When these bursts are introduced into the mass spectrometer, the ion beam intensity becomes a function of the chromatographic elution profile. Unlike conventional CDMS implementation which only analyzes single-ion trapping events and requires over an hour to collect sufficient data for the generation of a mass spectrum, simultaneous trapping of multiple ions and the subsequent analysis of multiple-ion trapping events significantly decrease the time necessary to collect a mass spectrum, making it possible to acquire a mass spectrum in several minutes. This also means that bursts in the ion beam intensity that coincide with the elution of separated molecules from the chromatograph can be characterized by CDMS in the same timeframe as the elution profile. In any implementations of the embodiment described in this paragraph, additional variants may include a mass spectrometer operatively positioned between the ion source stage IS$_2$ and the ELIT 14.

Referring now to FIG. 12B, a simplified block diagram is shown of another embodiment of an ion separation instrument 210 which illustratively includes a multi-stage mass spectrometer instrument 220 and which also includes the CDMS 100 including the ELIT 14 and, in some embodiments, the ion trajectory control apparatus 105 as described above, implemented as a high-mass ion analysis component. In the illustrated embodiment, the multi-stage mass spectrometer instrument 220 includes an ion source (IS) 12, as illustrated and described herein, followed by and coupled to a first conventional mass spectrometer (MS1) 204, followed by and coupled to a conventional ion dissociation stage (ID) 206 operable to dissociate ions exiting the mass spectrometer 204, e.g., by one or more of collision-induced dissociation (CID), surface-induced dissociation (SID), electron capture dissociation (ECD) and/or photo-induced dissociation (PID) or the like, followed by and coupled to a second conventional mass spectrometer (MS2) 208, followed by a conventional ion detector (D) 212, e.g., such as a microchannel plate detector or other conventional ion detector. The CDMS 100, is coupled in parallel with and to the ion dissociation stage 206 such that the CDMS 100 may selectively receive ions from the mass spectrometer 204 and/or from the ion dissociation stage 206.

MS/MS, e.g., using only the ion separation instrument 220, is a well-established approach where precursor ions of a particular molecular weight are selected by the first mass spectrometer 204 (MS1) based on their m/z value. The mass selected precursor ions are fragmented, e.g., by collision-induced dissociation, surface-induced dissociation, electron capture dissociation or photo-induced dissociation, in the ion dissociation stage 206. The fragment ions are then analyzed by the second mass spectrometer 208 (MS2). Only the m/z values of the precursor and fragment ions are measured in both MS1 and MS2. For high mass ions, the charge states are not resolved and so it is not possible to select precursor ions with a specific molecular weight based on the m/z value alone. However, by coupling the instrument 220 to the CDMS 100 as illustrated in FIG. 12B, it is possible to select a narrow range of m/z values and then use the CDMS 100 to determine the masses of the m/z selected precursor ions. The mass spectrometers 204, 208 may be, for example, one or any combination of a magnetic sector mass spectrometer, time-of-flight mass spectrometer or quadrupole mass spectrometer, although in alternate embodiments other mass spectrometer types may be used. In any case, the m/z selected precursor ions with known masses exiting MS1 can be fragmented in the ion dissociation stage 206, and the resulting fragment ions can then be analyzed by MS2 (where only the m/z ratio is measured) and/or by the CDMS instrument 100 (where the m/z ratios and charges of multiple ions are measured simultaneously). Low mass fragments, i.e., dissociated ions of precursor ions having mass values below a threshold mass value, e.g., 10,000 Da (or other mass value), can thus be analyzed by conventional MS, using MS2, while high mass fragments (where the charge states are not resolved), i.e., dissociated ions of precursor ions having mass values at or above the threshold mass value, can be analyzed by the CDMS 100.

It will be understood that the dimensions of the various components of the ELIT 14 and the magnitudes of the electric fields established therein, as implemented in any of the systems 10, 100, 200, 210 illustrated in the attached figures and described above, may illustratively be selected as to establish a desired duty cycle of ion oscillation within the ELIT 14, corresponding to a ratio of time spent by the ion(s) in the charge detection cylinder CD and a total time spent by the ion(s) traversing the combination of the ion mirrors M1, M2 and the charge detection cylinder CD during one complete oscillation cycle. For example, a duty cycle of approximately 50% may be desirable for the purpose of reducing noise in fundamental frequency magnitude determinations resulting from harmonic frequency components of the measured signals. Details relating to such dimensional and operational considerations for achieving a desired duty cycle, e.g., such as 50%, are illustrated and described in U.S. Patent Application Ser. No. 62/616,860, filed Jan. 12, 2018, U.S. Patent Application Ser. No. 62/680,343, filed Jun. 4, 2018 and International Patent Application No. PCT/US2019/013251, filed Jan. 11, 2019, all entitled ELECTROSTATIC LINEAR ION TRAP DESIGN FOR CHARGE DETECTION MASS SPECTROMETRY, the disclosures of which are all expressly incorporated herein by reference in their entireties.

It will be further understood that one or more charge detection optimization techniques may be used with the ELIT 14 in any of the systems 10, 100, 200, 210 illustrated in the attached figures and described herein e.g., for trigger trapping or other charge detection events. Examples of some such charge detection optimization techniques are illustrated and described in U.S. Patent Application Ser. No. 62/680,296, filed Jun. 4, 2018 and in International Patent Application No. PCT/US2019/013280, filed Jan. 11, 2019, both entitled APPARATUS AND METHOD FOR CAPTURING IONS IN AN ELECTROSTATIC LINEAR ION TRAP, the disclosures of which are both expressly incorporated herein by reference in their entireties.

It will be further understood that one or more charge calibration or resetting apparatuses may be used with the charge detection cylinder CD of the ELIT 14 in any of the systems 10, 100, 200, 210 illustrated in the attached figures and described herein. An example of one such charge calibration or resetting apparatus is illustrated and described in U.S. Patent Application Ser. No. 62/680,272, filed Jun. 4, 2018 and in International Patent Application No. PCT/US2019/013284, filed Jan. 11, 2019, both entitled APPARATUS AND METHOD FOR CALIBRATING OR RESETTING A CHARGE DETECTOR, the disclosures of which are both expressly incorporated herein by reference in their entireties.

It will be still further understood that the ELIT 14 illustrated in the attached figures and described herein, as part of any of the systems 10, 100, 200, 210 also illustrated in the attached figures and described herein, may alternatively be provided in the form of at least one ELIT array having two or more ELITs or ELIT regions and/or in any single ELIT including two or more ELIT regions, and that the concepts described herein are directly applicable to systems including one or more such ELITs and/or ELIT arrays. Examples of some such ELITs and/or ELIT arrays are illustrated and described in U.S. Patent Application Ser. No. 62/680,315, filed Jun. 4, 2018 and in co-pending International Patent Application No. PCT/US2019/013283, filed Jan. 11, 2019, both entitled ION TRAP ARRAY FOR HIGH THROUGHPUT CHARGE DETECTION MASS SPECTROMETRY, the disclosures of which are both expressly incorporated herein by reference in their entireties.

It will be further understood that one or more ion source optimization apparatuses and/or techniques may be used with one or more embodiments of the ion source 12 illustrated and described herein as part of or in combination with any of the systems 10, 150, 180, 200, 220 illustrated in the attached figures and described herein, some examples of which are illustrated and described in U.S. Patent Application Ser. No. 62/680,223, filed Jun. 4, 2018 and entitled HYBRID ION FUNNEL-ION CARPET (FUNPET) ATMOSPHERIC PRESSURE INTERFACE FOR CHARGE DETECTION MASS SPECTROMETRY, and in co-pending International Patent Application No. PCT/US2019/013274, filed Jan. 11, 2019 and entitled INTERFACE FOR TRANSPORTING IONS FROM AN ATMOSPHERIC PRESSURE ENVIRONMENT TO A LOW PRESSURE ENVIRONMENT, the disclosures of which are both expressly incorporated herein by reference in their entireties.

It will be further understood that any of the systems 10, 100, 200, 210 illustrated in the attached figures and described herein may be implemented in or as part of systems configured to operate in accordance with real-time analysis and/or real-time control techniques, some examples of which are illustrated and described in U.S. Patent Application Ser. No. 62/680,245, filed Jun. 4, 2018 and International Patent Application No. PCT/US2019/013277, filed Jan. 11, 2019, both entitled CHARGE DETECTION MASS SPECTROMETRY WITH REAL TIME ANALYSIS AND SIGNAL OPTIMIZATION, the disclosures of which are both expressly incorporated herein by reference in their entireties.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, it will be understood that the ELIT 14 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer DC or time-varying signals produced by one or more of the voltage sources, one or more ion mirrors defining additional electric field regions, or the like.

What is claimed is:

1. A charge detection mass spectrometer (CDMS), comprising:
an ion source configured to generate a beam of ions,
a mass spectrometer configured to separate the generated beam of ions as a function of ion mass-to-charge ratio to produce a resulting beam of separated ions,
an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, a first one of the pair of ions mirror defining an ion inlet aperture about the longitudinal axis through which the beam of separated ions enters the ELIT,
at least one voltage source operatively coupled to the pair of ion mirrors and configured to produce voltages for selectively establishing electric fields therein configured to trap within the ELIT a plurality of ions in the entering beam of separated ions and to cause the plurality of trapped ions to oscillate back and forth between the pair of ion mirrors each time passing through the charge detection cylinder, and
means for controlling a trajectory of the beam of separated ions entering the ion inlet aperture of the ELIT to cause the plurality of ions subsequently trapped within the ELIT to oscillate therein with a corresponding plurality of different planar ion oscillation trajectories angularly offset from one another about the longitudinal axis with each extending along the longitudinal axis and crossing the longitudinal axis in each of the pair of ion mirrors or a corresponding plurality of different cylindrical ion oscillation trajectories radially offset from one another about the longitudinal axis to form a plurality of nested cylindrical trajectories each extending along the longitudinal axis.

2. The CDMS of claim 1, wherein the ELIT is configured and controlled such that ions trapped therein oscillate back and forth through the charge detection cylinder between the first and second ion mirrors with a duty cycle, corresponding to a ratio of time spent by the ions moving through the charge detection cylinder and a total time spent by the ions traversing a combination of the first and second ion mirrors and the charge detection cylinder during one complete oscillation cycle, of approximately 50%.

3. The CDMS of claim 1, wherein the means for controlling the trajectory of the beam of separated ions entering the ion inlet of the ELIT comprises means for controlling at least one of a radial offset of the entering beam of separated ions relative to the longitudinal axis and an angle of the entering beam of separated ions relative to the longitudinal axis or relative to at least one other axis that passes through the ELIT and that is parallel to the longitudinal axis.

4. The CDMS of claim 3, wherein the means for controlling the trajectory of the beam of separated ions entering the ion inlet of the ELIT comprises:

means for determining a trajectory of the beam of separated ions, and means for modifying the trajectory of the beam of separated ions such that the beam of separated ions with the modified trajectory enter the ion inlet aperture of the ELIT.

5. An instrument for separating ions, comprising:

the CDMS of claim 1, and at least one ion processing instrument positioned between the ion source and the mass spectrometer, the at least one ion processing instrument positioned between the ion source and the mass spectrometer comprising one or any combination of at least one instrument for collecting or storing ions, at least one instrument for filtering ions according to a molecular characteristic, at least one instrument for dissociating ions, at least one instrument for normalizing or shifting ion charge states and at least one instrument for separating ions as a function of at least one molecular characteristic.

6. An instrument for separating ions, comprising:

the CDMS of claim 1, and at least one ion processing instrument positioned between the mass spectrometer and the ELIT, the at least one ion processing instrument positioned between the mass spectrometer and the ELIT comprising one or any combination of at least one instrument for collecting or storing ions, at least one instrument for filtering ions according to a molecular characteristic, at least one instrument for dissociating ions, at least one instrument for normalizing or shifting ion charge states and at least one instrument for separating ions as a function of at least one molecular characteristic.

7. An instrument for separating ions, comprising:

the CDMS of claim 1, wherein the ELIT is configured to allow ion exit therefrom, and at least one ion separation instrument positioned to receive ions exiting the ELIT and to separate the received ions exiting the ELIT as a function of at least one molecular characteristic.

8. The instrument of claim 7, further comprising at least one ion processing instrument positioned between the ELIT and the at least one ion separation instrument, the at least one ion processing instrument positioned between the ELIT and the at least one ion separation instrument comprising one or any combination of at least one instrument for collecting or storing ions, at least one instrument for filtering ions according to a molecular characteristic, at least one instrument for dissociating ions and at least one instrument for normalizing or shifting ion charge states.

9. The instrument of claim 7, further comprising at least one ion processing instrument positioned to receive ions exiting the at least one ion separation instrument that is itself positioned to receive ions exiting the ELIT, the at least one ion processing instrument positioned to receive ions exiting the at least one ion separation instrument that is positioned to receive ions exiting the ELIT comprising one or any combination of at least one instrument for collecting or storing ions, at least one instrument for filtering ions according to a molecular characteristic, at least one instrument for dissociating ions and at least one instrument for normalizing or shifting ion charge states.

10. An instrument for separating ions, comprising:

the CDMS of claim 1, wherein the ELIT is configured to allow ion exit therefrom, and at least one ion processing instrument positioned to receive ions exiting the ELIT, the at least one ion processing instrument positioned to receive ions exiting the ELIT comprising one or any combination of at least one instrument for collecting or storing ions, at least one instrument for filtering ions according to a molecular characteristic, at least one instrument for dissociating ions and at least one instrument for normalizing or shifting ion charge states.

11. An instrument for separating ions, comprising:

an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS) coupled in parallel with and to the ion dissociation stage such that the CDMS can receive ions exiting either of the first mass spectrometer and the ion dissociation stage, the CDMS comprising (i) at least one ion separation instrument configured to separate ions as a function of at least one molecular characteristic, (ii) an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, a first one of the pair of ions mirror defining an ion inlet aperture about the longitudinal axis through which the beam of separated ions enters the ELIT, (iii) at least one voltage source operatively coupled to the pair of ion mirrors and configured to produce voltages for selectively establishing electric fields therein configured to trap within the ELIT a plurality of ions in the entering beam of separated ions and to cause the plurality of trapped ions to oscillate back and forth between the pair of ion mirrors each time passing through the charge detection cylinder, and (iv) means for controlling a trajectory of the beam of separated ions entering the ion inlet aperture of the ELIT to cause the plurality of ions subsequently trapped within the ELIT to oscillate therein with a corresponding plurality of different planar ion oscillation trajectories angularly offset from one another about the longitudinal axis with each extending along the longitudinal axis and crossing the longitudinal axis in each of the pair of ion mirrors or a corresponding plurality of different cylindrical ion oscillation trajectories radially offset from one another about the longitudinal axis to form a plurality of nested cylindrical trajectories each extending along the longitudinal axis, wherein masses of precursor ions exiting the first mass spectrometer are measured using the CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

12. A method of simultaneously measuring at least two ions in a beam of ions supplied to an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, wherein a first one of the pair of ions mirror defines an ion inlet aperture about the longitudinal axis through which the supplied beam of ions enters the ELIT, the method comprising:

controlling at least one voltage source to apply voltages to the pair of ion mirrors to establish an ion transmission electric field therein to pass the beam of ions supplied to the ion inlet aperture of the ELIT through each of the pair of ion mirrors and through the charge detection cylinder and through an ion exit defined by a second one of the pair of ion mirrors, wherein each ion transmission electric field is configured to focus ions passing therethrough toward the longitudinal axis, controlling the at least one voltage source to modify the voltages applied to the pair of ion mirrors to establish an ion reflection electric field therein to trap within the ELIT at least two of the ions in the beam of ions supplied to the ion inlet aperture of the ELIT, wherein each ion reflection electric field is configured to cause ions entering a respective one of the pair of ion mirrors from the charge detection cylinder to stop and accelerate in an opposite direction back through the charge detection cylinder and toward the other of the pair of ion mirrors while also focusing the ions toward the longitudinal axis, and controlling a trajectory of the beam of ions entering the ion inlet aperture of the ELIT to cause the at least two ions subsequently trapped within the ELIT to oscillate therein with at least two different planar ion oscillation trajectories angularly offset from one another about the longitudinal axis with each extending along the longitudinal axis and crossing the longitudinal axis in each of the pair of ion mirrors.

13. The method of claim 12, wherein controlling the trajectory of the beam of ions comprises generating the beam of ions as a collimated beam of ions, and controlling the collimated beam of ions to enter into the ion inlet aperture with a distribution of radial offsets about the longitudinal axis.

14. The method of claim 12, wherein controlling the trajectory of the beam of ions comprises generating the beam of ions as a collimated beam of ions, controlling the collimated beam of ions to enter to ion inlet aperture and then controlling the at least one voltage source to selectively modify the ion transmission electric field within the first one of the pair of ion mirrors to vary a focusing power thereof to impart an angular convergence on the entering collimated ion beam toward a focal point that lies on the longitudinal axis within the ELIT.

15. A method of simultaneously measuring at least two ions in a beam of ions supplied to an electrostatic linear ion trap (ELIT) including a pair of coaxially aligned ion mirrors and an elongated charge detection cylinder disposed therebetween and coaxially aligned therewith such that a longitudinal axis of the ELIT passes centrally through each, wherein a first one of the pair of ions mirror defines an ion inlet aperture about the longitudinal axis through which the supplied beam of ions enters the ELIT, the method comprising:

controlling at least one voltage source to apply voltages to the pair of ion mirrors to establish an ion transmission electric field therein to pass the beam of ions supplied to the ion inlet aperture of the ELIT through each of the pair of ion mirrors and through the charge detection cylinder and through an ion exit defined by a second one of the pair of ion mirrors, wherein each ion transmission electric field is configured to focus ions passing therethrough toward the longitudinal axis, controlling the at least one voltage source to modify the voltages applied to the pair of ion mirrors to establish an ion reflection electric field therein to trap within the ELIT at least two of the ions in the beam of ions supplied to the ion inlet aperture of the ELIT, wherein each ion reflection electric field is configured to cause ions entering a respective one of the pair of ion mirrors from the charge detection cylinder to stop and accelerate in an opposite direction back through the charge detection cylinder and toward the other of the pair of ion mirrors while also focusing the ions toward the longitudinal axis, and controlling a trajectory of the beam of ions entering the ion inlet aperture of the ELIT to cause the at least two ions subsequently trapped within the ELIT to oscillate therein with at least two different cylindrical ion oscillation trajectories radially offset from one another about the longitudinal axis to form at least two nested cylindrical ion oscillation trajectories each extending along the longitudinal axis.

16. The method of claim 15, wherein controlling the trajectory of the beam of ions comprises generating the beam of ions as a collimated beam of ions, focusing the collimated beam into a point along the longitudinal axis at the ion inlet aperture and sweeping the focused point of ions along a line of radial offsets relative to the longitudinal axis.

17. The method of claim 15, wherein controlling the trajectory of the beam of ions comprises generating the beam of ions as a collimated beam of ions, focusing the collimated beam into a plane at the ion inlet aperture and offsetting the focused plane relative to the longitudinal axis.

18. The method of claim 15, wherein controlling the trajectory of the beam of ions comprises generating the beam of ions as an uncollimated beam of ions that includes a distribution of radial offsets relative to the longitudinal axis and a distribution of divergence angles relative to two or more radial offset lines parallel with the longitudinal axis, and controlling the uncollimated beam of ions to enter into the ion inlet aperture.

19. The method of claim 15, wherein controlling the trajectory of the beam of ions comprises controlling inner and outer radii of any of the at least two cylindrical ion oscillation trajectories relative to the longitudinal axis by controlling respective magnitudes of radial offsets of the entering beam of ions.

20. The method of claim 15, wherein controlling the trajectory of the beam of ions comprises controlling a thickness between inner and outer radii of any of the at least two cylindrical ion oscillation trajectories by controlling respective magnitudes of divergence angles of the entering beam of ions.

* * * * *